United States Patent
Kim et al.

(10) Patent No.: US 11,939,719 B2
(45) Date of Patent: Mar. 26, 2024

(54) LAUNDRY DRYING MACHINE AND CONTROLLING METHOD OF LAUNDRY DRYING MACHINE

(71) Applicant: LG Electronics Inc., Seoul (KR)

(72) Inventors: Jihoon Kim, Seoul (KR); Junghoon Lee, Seoul (KR); Chanwoo Moon, Seoul (KR); Youngmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 17/468,203

(22) Filed: Sep. 7, 2021

(65) Prior Publication Data

US 2022/0074121 A1 Mar. 10, 2022

(30) Foreign Application Priority Data

Sep. 7, 2020 (KR) .......................... 10-2020-0113622
Sep. 7, 2020 (KR) .......................... 10-2020-0113623
Sep. 7, 2020 (KR) .......................... 10-2020-0113624

(51) Int. Cl.
*D06F 58/38* (2020.01)
*D06F 34/10* (2020.01)
(Continued)

(52) U.S. Cl.
CPC .............. *D06F 58/38* (2020.02); *D06F 34/10* (2020.02); *D06F 58/08* (2013.01); *D06F 58/26* (2013.01);
(Continued)

(58) Field of Classification Search
CPC .......... D06F 58/38; D06F 34/10; D06F 58/08; D06F 58/26; D06F 58/46; D06F 58/48;
(Continued)

(56) References Cited

U.S. PATENT DOCUMENTS 8,826,561 B2    9/2014  Wisherd et al.
2013/0219737 A1*  8/2013  Rogers .................... F26B 3/347
                                                  34/255
(Continued)

FOREIGN PATENT DOCUMENTS

EP          3246454 B1    11/2019

OTHER PUBLICATIONS

Extended European Search Report in European Appln No. 21195174.4, dated Jan. 24, 2022, 11 pages.
(Continued)

*Primary Examiner* — John P McCormack
(74) *Attorney, Agent, or Firm* — Fish & Richardson P.C.

(57) ABSTRACT

A laundry drying machine includes: a cabinet, a drum rotatably disposed in the cabinet and configured to accommodate a target object, an electric field generator spaced apart from the drum and configured to, based on power being applied to the electric field generator, generate an electric field, and an exhaust duct configured to discharge air inside the drum. The electric field generator includes: (i) an anode electrode spaced apart from the drum, fixed to the cabinet, and configured to apply the electric field to the target object, (ii) a power supply unit configured to supply the power to the anode electrode, and (iii) a matcher configured to match a source impedance of the power and an impedance of a load side. The drum is configured to, based on a reflectivity of the electric field exceeding a predetermined ratio, reduce a rotation speed.

20 Claims, 17 Drawing Sheets

(51) Int. Cl.
*D06F 58/08* (2006.01)
*D06F 58/26* (2006.01)
*D06F 58/46* (2020.01)
*D06F 58/48* (2020.01)
*H05B 6/54* (2006.01)
*H05B 6/62* (2006.01)
*D06F 103/04* (2020.01)
*D06F 103/64* (2020.01)
*D06F 105/48* (2020.01)

(52) U.S. Cl.
CPC ............. *D06F 58/46* (2020.02); *D06F 58/48* (2020.02); *H05B 6/54* (2013.01); *H05B 6/62* (2013.01); *D06F 2103/04* (2020.02); *D06F 2103/64* (2020.02); *D06F 2105/48* (2020.02)

(58) Field of Classification Search
CPC ............. D06F 2103/04; D06F 2103/64; D06F 2105/48; D06F 2103/32; D06F 2103/44; D06F 2103/52; D06F 2105/28; D06F 2105/52; D06F 58/02; D06F 2103/02; H05B 6/54; H05B 6/62; Y02B 40/00

USPC .................. 34/255, 250, 259, 260, 261, 265
See application file for complete search history.

(56) References Cited

U.S. PATENT DOCUMENTS

| | | |
|---|---|---|
| 2015/0089979 A1 | 4/2015 | Hengesbach et al. |
| 2016/0130743 A1* | 5/2016 | Wisherd ................ D06F 58/266 34/132 |
| 2019/0271504 A1* | 9/2019 | Herman .................. F26B 3/347 |
| 2020/0308750 A1 | 10/2020 | Woo et al. |

OTHER PUBLICATIONS

Extended European Search Report in European Appln No. 21195178.5, dated Jan. 24, 2022, 12 pages.

Office Action in U.S. Appl. No. 17/468,183, dated Jun. 14, 2023, 14 pages.

Extended European Search Report in European Appln No. 21195185.0, dated Jan. 28, 2022, 9 pages.

* cited by examiner

Prior Art

LAUNDRY DRYING MACHINE AND CONTROLLING METHOD OF LAUNDRY DRYING MACHINE

CROSS-REFERENCE TO RELATED APPLICATIONS

Pursuant to 35 U.S.C. § 119(a), this application claims the benefit of the earlier filing date and the right of priority to Korean Patent Application Nos. 10-2020-0113622, filed on Sep. 7, 2020, 10-2020-0113623, filed on Sep. 7, 2020, and 10-2020-0113624, filed on Sep. 7, 2020, the contents of which are hereby incorporated by reference in their entirety.

TECHNICAL FIELD

The present disclosure relates to a laundry drying machine and a controlling method of the laundry drying machine, and more particularly, a laundry drying machine that is configured to generate a high frequency and dry a target object through dielectric heating, and a controlling method of the laundry drying machine.

BACKGROUND

Recently, a clothes treatment apparatus that performs a drying cycle for removing moisture from clothes has been developed. A conventional clothes treatment apparatus supplies hot air to a drum accommodating clothes to dry the clothes, thereby greatly shortening the drying time of clothes, and sterilizing and disinfecting the clothes.

However, the conventional clothes treatment apparatus uses the heat transferred from the heated air to increase the temperature of the water contained in the clothes to induce the evaporation of water. Since heat is transferred from air with a low specific heat to water with a higher specific heat, the actual temperature rise of water is not high compared to the temperature of the heated air, and the drying performance is low compared to the power consumed.

In addition, for the water contained in the clothes to reach the evaporation temperature, the temperature in a drum must be at a high temperature of 100 degrees Celsius or more. However, the high temperature air causes a problem of denaturation and damages to the clothes when it comes into contact with the clothes.

In addition, such a drying machine is also equipped with an exhaust system for discharging the water evaporated from the clothes to the outside of the drying machine. In this case, since the temperature inside the drum is inevitably lowered due to the continuous discharge of heated air, the operation time of the heater is increased, so there is a problem in that power consumption and drying time are increased.

To solve this problem, a conventional laundry drying machine includes Radio Frequency (RF) heating systems. For example, the conventional laundry drying machine includes a high-frequency (RF) laundry drying machine that vibrates moisture absorbed in clothes and heats the clothes has been developed.

In a high-frequency (RF) laundry drying machine, there is a process for rotating only the drum at 50 rpm without the RF power supply in order to solve the problem of overheating when the RF power supply is used for a long period of time, and to evenly heat a target object, which include laundry, by moving the target object.

However, in this process, the target object rotates inside the drum by centrifugal force and falls due to gravity during the rotation. Accordingly, a situation in which the target object is contracted by such mechanical force occurs.

A conventional laundry drying machine includes a dielectric heating type laundry drying machine.

In the drying machine, a cathode electrode and an anode electrode are rotatably provided, and when RF power of a predetermined frequency is applied, an electric field is generated to heat the moisture contained in clothes.

On the other hand, since both the cathode electrode and the anode electrode are provided in a rotating form, the drum must be essentially stopped in order to form a constant electric field.

However, when the internal temperature of the target object rapidly increases as described above, there is a problem in that local overheating occurs inside the target object. In particular, when the target object is a dyed synthetic fiber, there is a problem in that color transfer occurs due to local overheating. In the case of synthetic fibers, if the temperature exceeds 50 degrees Celsius, there is a possibility of color transfer.

A conventional laundry drying machine may also include a laundry drying machine that uses an electrode to dielectrically heat the target object.

For such drying machine, an anode electrode is fixed, and a drum serving as a cathode electrode is provided in a rotatable state.

When a drying process is started in the drying machine, RF power is applied to the anode electrode while the drum is stopped. Impedance matching is easy when the drum is stopped, and after the impedance matching, continuous heating is possible, which is effective in heating the moisture contained in the target object at a high speed.

However, even in this case, there is a problem in that the internal temperature of the target object rapidly rises, resulting in local overheating.

In this case, after heating the target object for 90 seconds to prevent local overheating inside the clothes, the RF current supply is stopped and the drum is rotated for 5 seconds to move the target object.

However, in this method, since dielectric heating is performed again in a state in which the heat inside the target object is not sufficiently discharged, there is an issue that the internal temperature of the target object continuously increases as the drying cycle proceeds.

In addition, in this method, a matcher must match the impedance for less than 7 seconds in order to supply RF power again, and during this process, power consumption may occur, so that there is an issue that the overall drying time is increased.

In addition, in the case of heating after sufficiently discharging internal heat, the energy and time required for performing dielectric heating again are large, so there is a problem in that the drying efficiency is decreased.

In addition, in the process of moving the target object inside the drum, the falling motion of the target object may occur due to the centrifugal force of the drum, and the clothes may be shrunk.

A conventional laundry drying machine may also include a drying machine that performs both RF drying and hot air drying.

In such a drying machine, a cathode electrode and an anode electrode are rotatably provided, and when RF power of a predetermined frequency is applied, an electric field is generated to heat the moisture contained in clothes. Therefore, the drum must be essentially stopped in order to form a constant electric field.

Accordingly, the drying machine also stops the drum for heating and repeats the operation of rotating the drum to prevent local overheating of the clothes, thereby increasing energy consumption and drying time.

The drying machine may perform hot air drying while rotating the drum in order to solve the problem of increasing the drying time. However, when both dielectric heating and hot air drying are performed, power consumption may be very large.

In addition, while the inside of the target object is heated by the dielectric heating, the outside of the target object is also heated by the hot air drying, thereby causing damage to the target object.

Therefore, there is a need to develop a technology capable of minimizing energy consumption while shortening the drying time.

A conventional laundry drying machine may also include a hot air type drying machine. In the drying machine, the drum was constantly rotated at 50 rpm so that hot air is uniformly supplied to the target object during the drying process.

In this case, the target object is rotated by centrifugal force and moved upwards inside the drum, and is dropped by gravity. In this case, the drying performance may be increased by increasing the contact area with the hot air while the target object is falling, but there is an issue that the target object is shrunk.

SUMMARY

The present disclosure is directed to improving the problems of the conventional laundry drying machine and the control method of the laundry drying machine as described above. Further, the present disclosure is directed to a laundry drying machine and a control method of the laundry drying machine that can limit the occurrence of color transfer in a target object.

Another object of the present disclosure is directed to a laundry drying machine and a method for controlling the laundry drying machine that can limit local overheating of a target object.

Another object of the present disclosure is directed to a laundry drying machine and a control method of the laundry drying machine that can heat a target object accommodated in a drum in a dielectric heating type drying machine while rotating the drum.

Another object of the present disclosure is directed to a laundry drying machine and a control method of the laundry drying machine that can increase drying efficiency in a dielectric heating type drying machine that consumes a lot of energy and time required for dielectric heating.

Another object of the present disclosure is directed to a laundry drying machine and a method for controlling the laundry drying machine that can minimize energy consumption in a drying process.

Another object of the present disclosure is directed to a laundry drying machine and a control method of the laundry drying machine that can limit the occurrence of color transfer of a target object regardless of the size of the laundry drying machine.

Another object of the present disclosure is directed to a laundry drying machine and a method for controlling the laundry drying machine that can limit damage to an equipment such as a matcher due to the generation of reflected waves according to the rotation of a drum.

Another object of the present disclosure is directed to a laundry drying machine and a control method of the laundry drying machine that can save time and energy required for impedance matching.

Another object of the present disclosure is directed to a laundry drying machine and a control method of the laundry drying machine that can block a target object from falling in the process of moving the target object.

Another object of the present disclosure is directed to a laundry drying machine and a method for controlling the laundry drying machine that can reduce the shrinkage of a target object and provide a degree of shrinkage similar to that of natural drying.

According to one aspect of the subject matter described in this application, a laundry drying machine includes a cabinet, a drum that is rotatably disposed in the cabinet that is configured to accommodate a target object, an electric field generator that is spaced apart from the drum and that is configured to, based on power being applied to the electric field generator, generate an electric field inside the drum, and an exhaust duct configured to discharge air inside the drum. The electric field generator can include an anode electrode that is spaced apart from the drum, that is fixed to the cabinet, and that is configured to apply the electric field to the target object accommodated in the drum, a power supply unit that is configured to supply the power to the anode electrode, and a matcher that is provided in the cabinet and that is configured to match a source impedance of the power and an impedance of a load side, and the drum can be configured to, based on a reflectivity of the electric field exceeding a predetermined ratio, reduce a rotation speed.

Implementations according to this aspect can include one or more of the following features. For example, the electric field generator can be configured to, based on the reflectivity of the electric field being less than or equal to the predetermined ratio, increase the power applied to the anode electrode.

In some implementations, the drum can be configured to, based on the reflectivity of the electric field exceeding the predetermined ratio, reduce a rotation rate by 10%. In some examples, the electric field generator can be configured to, based on the power being started to apply to the anode electrode, apply the power corresponding to a preset start power to the anode electrode, and the electric field generator can be configured to, based on the reflectivity of the electric field being less than or equal to the predetermined ratio, apply the power corresponding to 20% of a preset drying power.

In some examples, the electric field generator can be configured to, based on (i) the power applied to the anode electrode corresponding to 20% of the preset drying power and (ii) the reflectivity of the electric field being less than or equal to the predetermined ratio, apply the power corresponding to 50% of the drying power to the anode electrode. In some examples, the electric field generator can be configured to, based on (i) the power applied to the anode electrode corresponding to 50% of the drying power and (ii) the reflectivity of the electric field being less than or equal to the predetermined ratio, apply the power corresponding to 100% of the drying power to the anode electrode.

In some implementations, the drum can be configured to, based on (i) a preset drying power being applied to the anode electrode and (ii) the reflectivity of the electric field reflected from the target object being less than or equal to the predetermined ratio, maintain the rotation speed. In some implementations, the drum can be configured to, based on the power being applied to the anode electrode, rotate.

In some implementations, the exhaust duct can include an air suction pipe, a fan housing, and an exhaust pipe. In some examples, the laundry drying machine can further include an air outlet that is in communication with the air suction pipe. In some implementations, the air suction pipe can have a flat shape.

According to another aspect of the subject matter described in this application, a control method of a laundry drying machine that includes a drum configured to accommodate a target object and an anode electrode spaced apart from the drum and configured to generate an electric field in the drum, can include a drying step of applying power to the anode electrode and rotating the drum, and an agitating step of cutting off the power applied to the anode electrode and rotating the drum. In the drying step, the drum can be configured to, based on a reflectivity of the electric field exceeding a predetermined ratio, reduce a rotation speed, and the power applied to the anode electrode can be increased based on the reflectivity of the electric field being less than or equal to the predetermined ratio.

Implementations according to this aspect can include one or more of the following features. For example, the drying step can include a drying entry step of applying a preset start power to the anode electrode and rotating the drum at a preset start rotation speed, and a rotation maintaining step of applying a preset drying power to the anode electrode and maintaining the rotation speed of the drum.

In some examples, in the drying step, the drum can be configured to, based on the reflectivity of the electric field exceeding the predetermined ratio after the drying entry step, reduce the rotation speed. In some examples, the drying step can further include a first power increasing step of increasing the power applied to the anode electrode to 20% of the drying power based on the reflectivity of the electric field being less than or equal to the predetermined ratio after the drying entry step.

In some implementations, in the drying step, the drum can be configured to, based on the reflectivity of the electric field exceeding the predetermined ratio after the first power increasing step, reduce the rotation speed. In some implementations, the drying step can further include a second power increasing step of increasing the power applied to the anode electrode to 50% of the drying power based on the reflectivity of the electric field being less than or equal to the predetermined ratio after the first power increasing step.

In some examples, in the drying step, the drum can be configured to, based on the reflectivity of the electric field exceeding the predetermined ratio after the second power increasing step, reduce the rotation speed. In some examples, the drying step can further include a third power increasing step of increasing the power applied to the anode electrode to the drying power based on the reflectivity of the electric field being less than or equal to the predetermined ratio after the second power increasing step.

In some implementations, in the drying step, the drum can be configured to, based on the reflectivity of the electric field exceeding the predetermined ratio after the third power increasing step, reduce the rotation speed.

As described above, according to the laundry drying machine and the control method of the laundry drying machine, there is an effect of limiting the occurrence of color transfer in a target object by maintaining the internal temperature of the target object at 50 degrees or less.

In addition, there is an effect of limiting local overheating of a target object while the target object is moved by the rotation of a drum.

In addition, there is an effect that a target object accommodated in a drum can be heated while the drum rotates in a dielectric heating type drying machine in which the drum rotates a low speed in a state in which an anode electrode is fixed.

In a dielectric heating type drying machine that consumes a lot of energy and time required for dielectric heating, there is an effect of increasing drying efficiency by rotating a drum even in a state in which power is applied to an anode electrode.

In addition, there is an effect that can minimize energy consumption by minimizing the rotation speed of a drum in a drying process and agitation calibration.

In addition, there is an effect of limiting color transfer of a target object regardless of the size of a laundry drying machine by presenting a minimum rotation speed of a drum in proportion to an angle surrounding an anode electrode and the drum.

In addition, there is an effect of limiting damage to an equipment such as a matcher due to a reflected wave by controlling a rotation speed of a drum and RF power to lower a reflectivity of an electric field.

In addition, since a drying process can be started immediately without a separate impedance matching time, there is an effect of saving time and energy required for impedance matching.

In addition, there is an effect that a target object can slide along an inner circumferential surface of a drum without falling in the process of moving the target object by setting a rotation speed range of the drum.

In addition, there is an effect of reducing the shrinkage of a target object due to mechanical force by blocking the falling motion of the target object.

DETAILED DESCRIPTION

Figure 1:
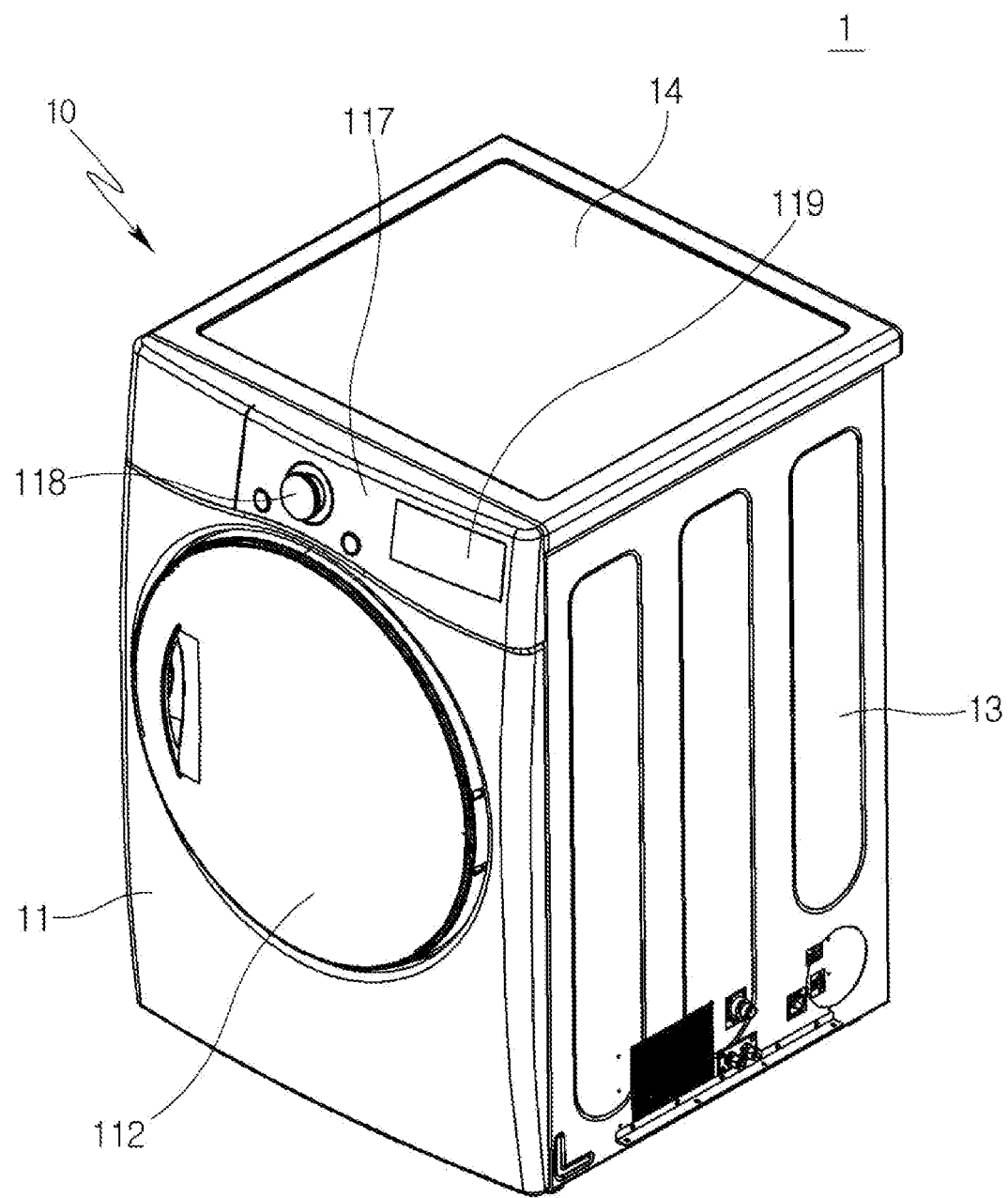
FIG. 1 is a diagram illustrating an exemplary laundry drying machine.
Figure 2:
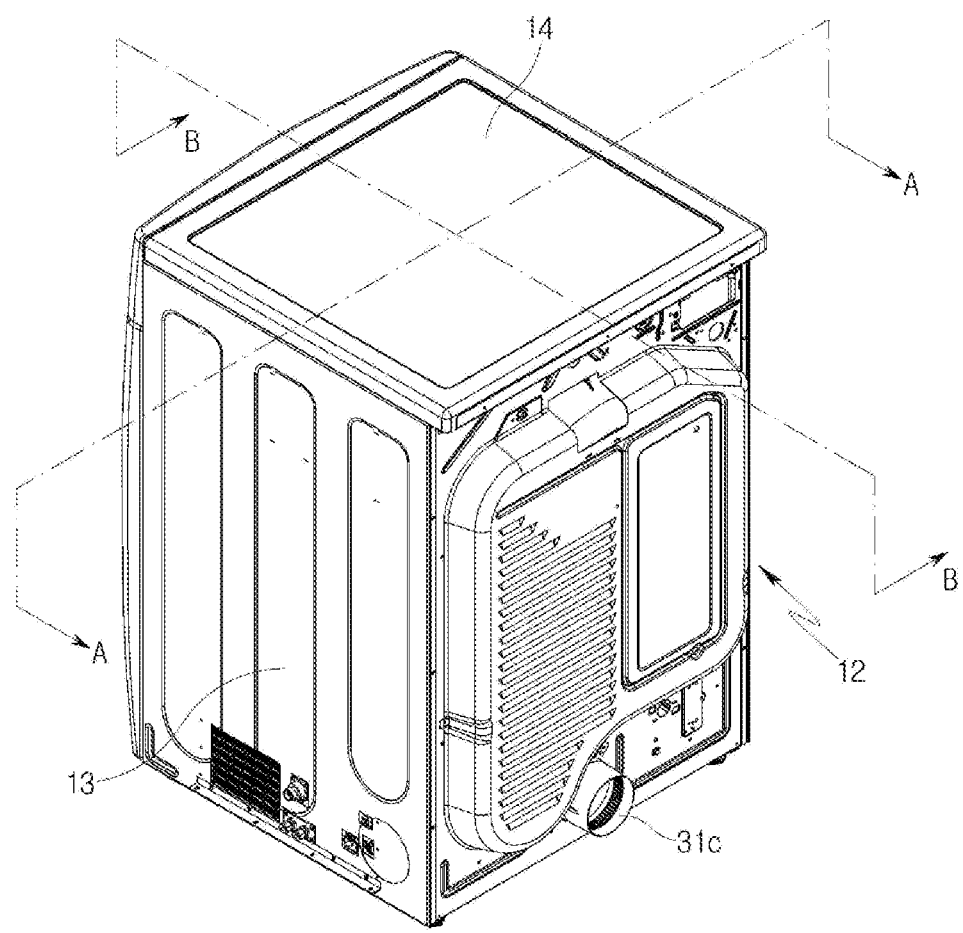
FIG. 2 is a diagram illustrating a view of the exemplary laundry drying machine in FIG. 1 from another angle.
Figure 3:
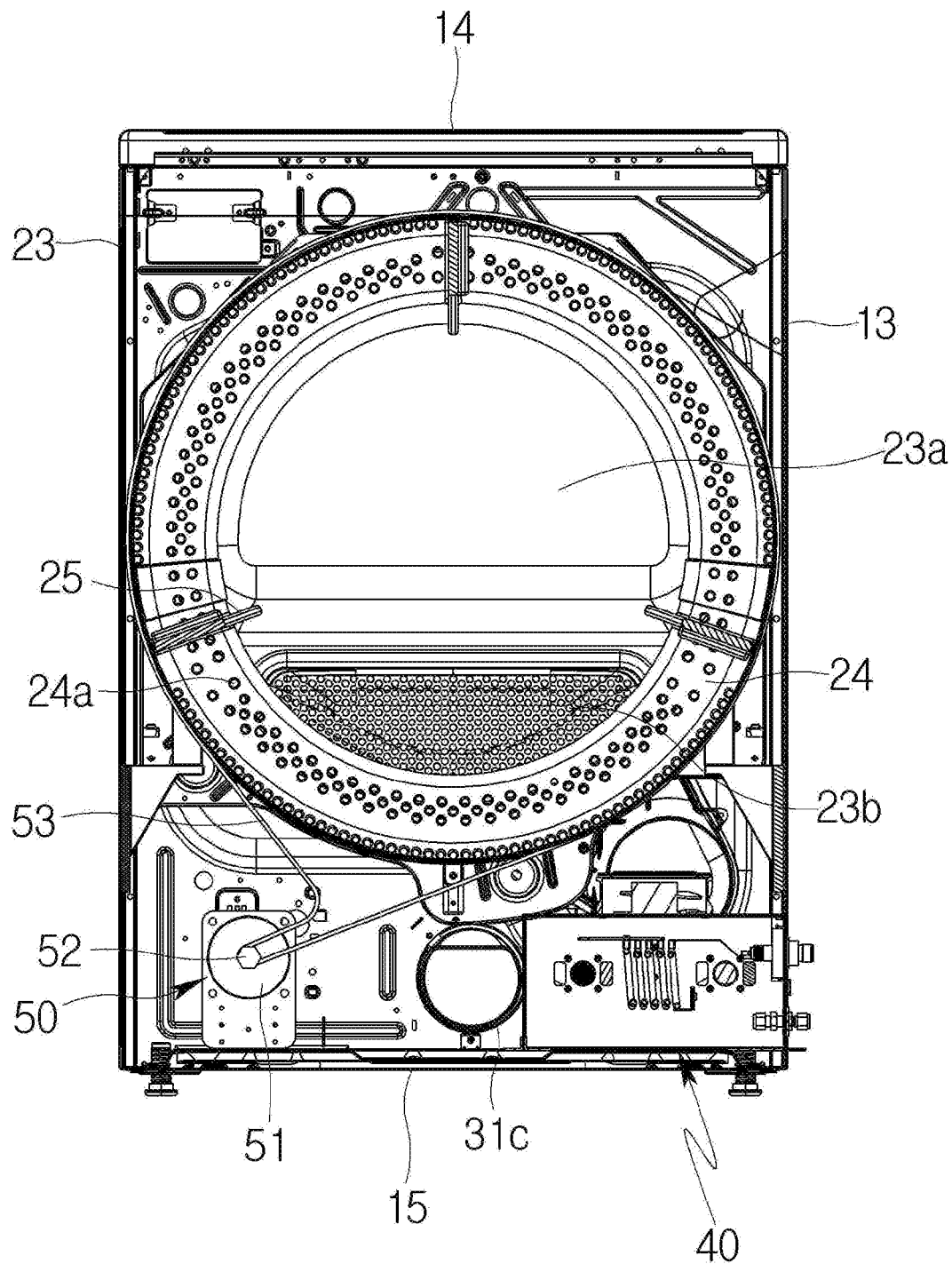
FIG. 3 is a diagram illustrating a cross-sectional view taken along line A-A in FIG. 2.
Figure 4:
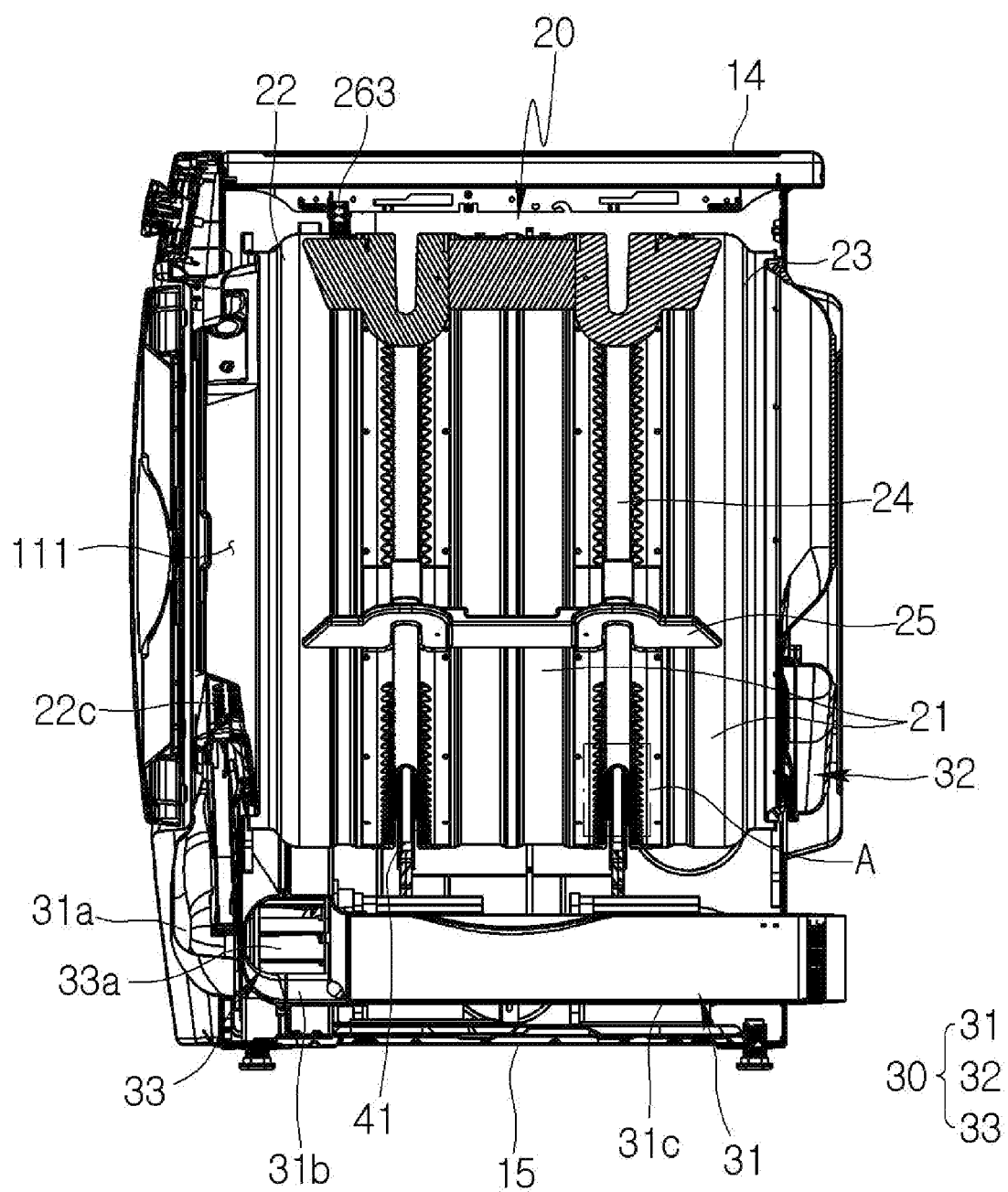
FIG. 4 is a diagram illustrating a cross-sectional view taken along line B-B in FIG. 2.
Figure 5:
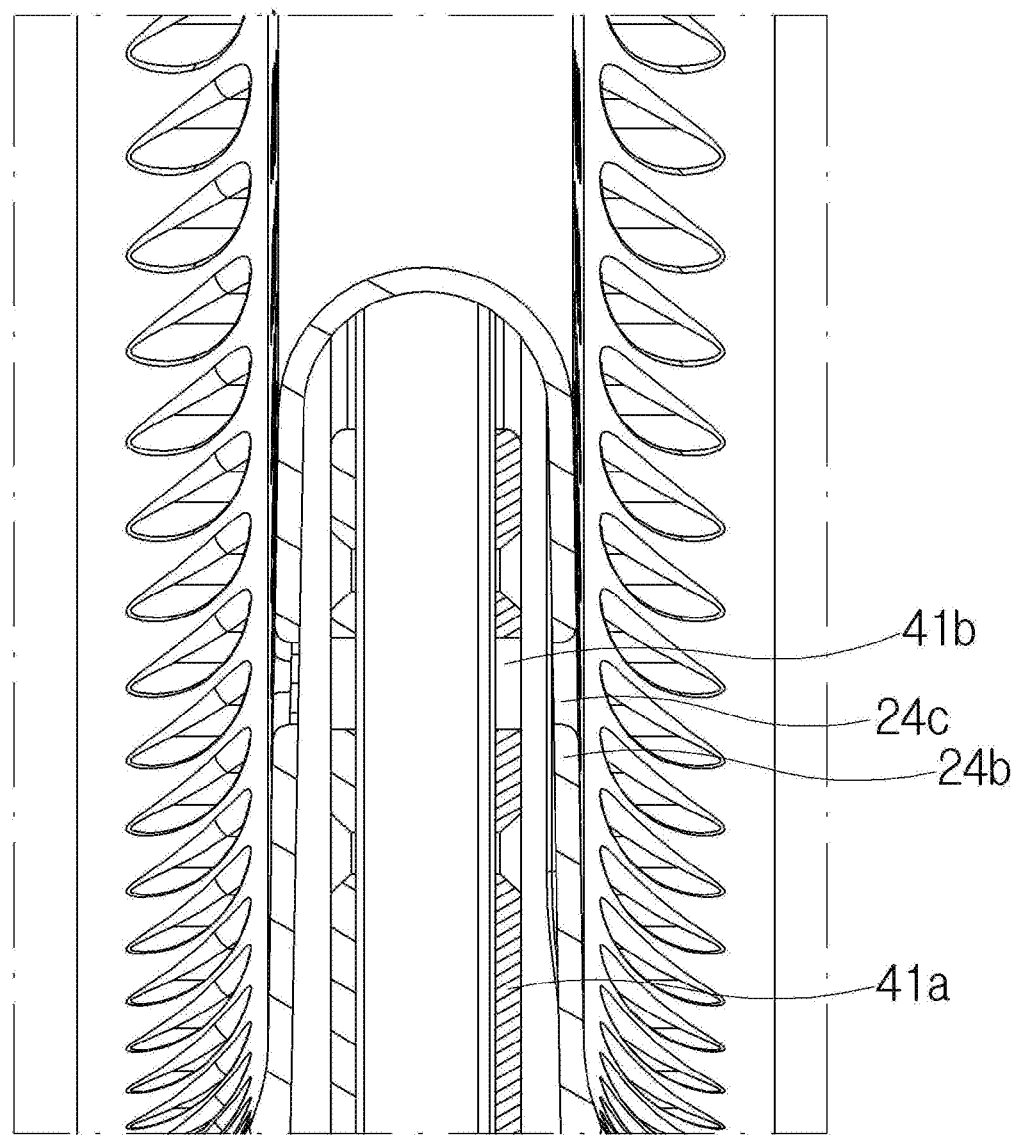
FIG. 5 is a diagram illustrating a partially enlarged view of part A of FIG. 4.
Figure 6:
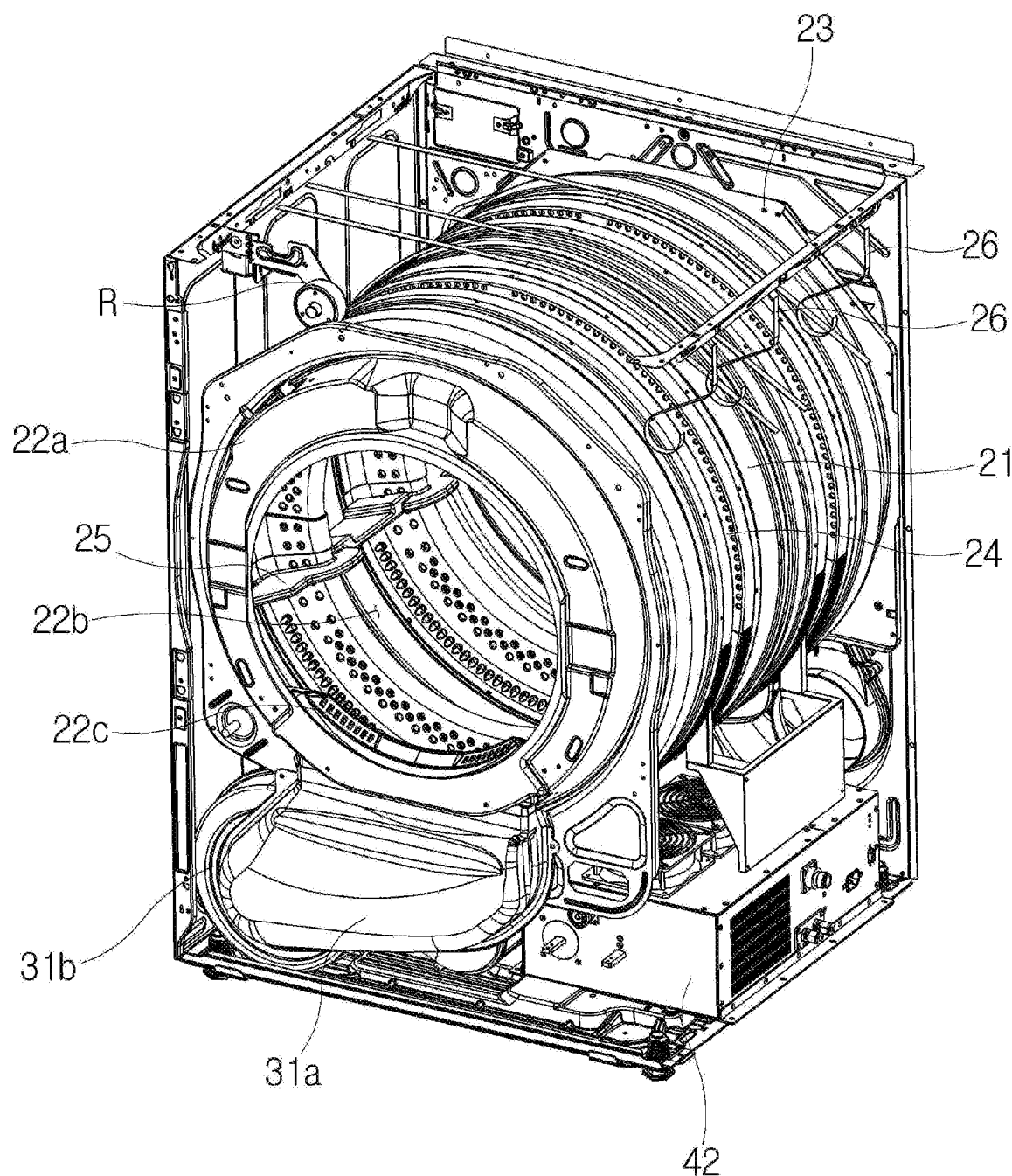
FIG. 6 is a diagram illustrating a view of a state in which a front panel, an upper panel, and a side panel are disassembled in the exemplary laundry drying machine.
Figure 7:
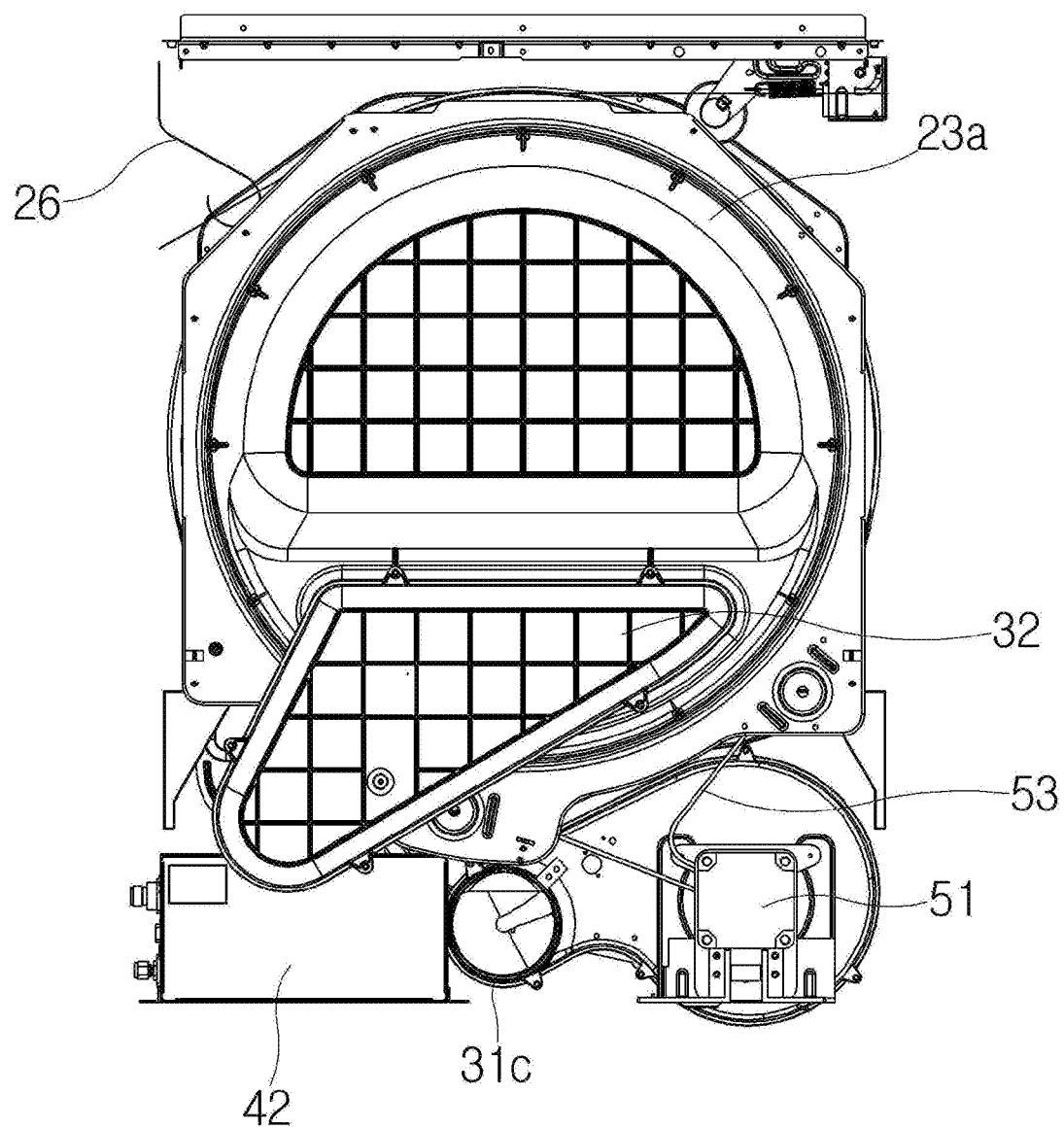
FIG. 7 is a diagram illustrating a rear view of a state in which a rear panel is disassembled in the exemplary laundry drying machine.
Figure 8:
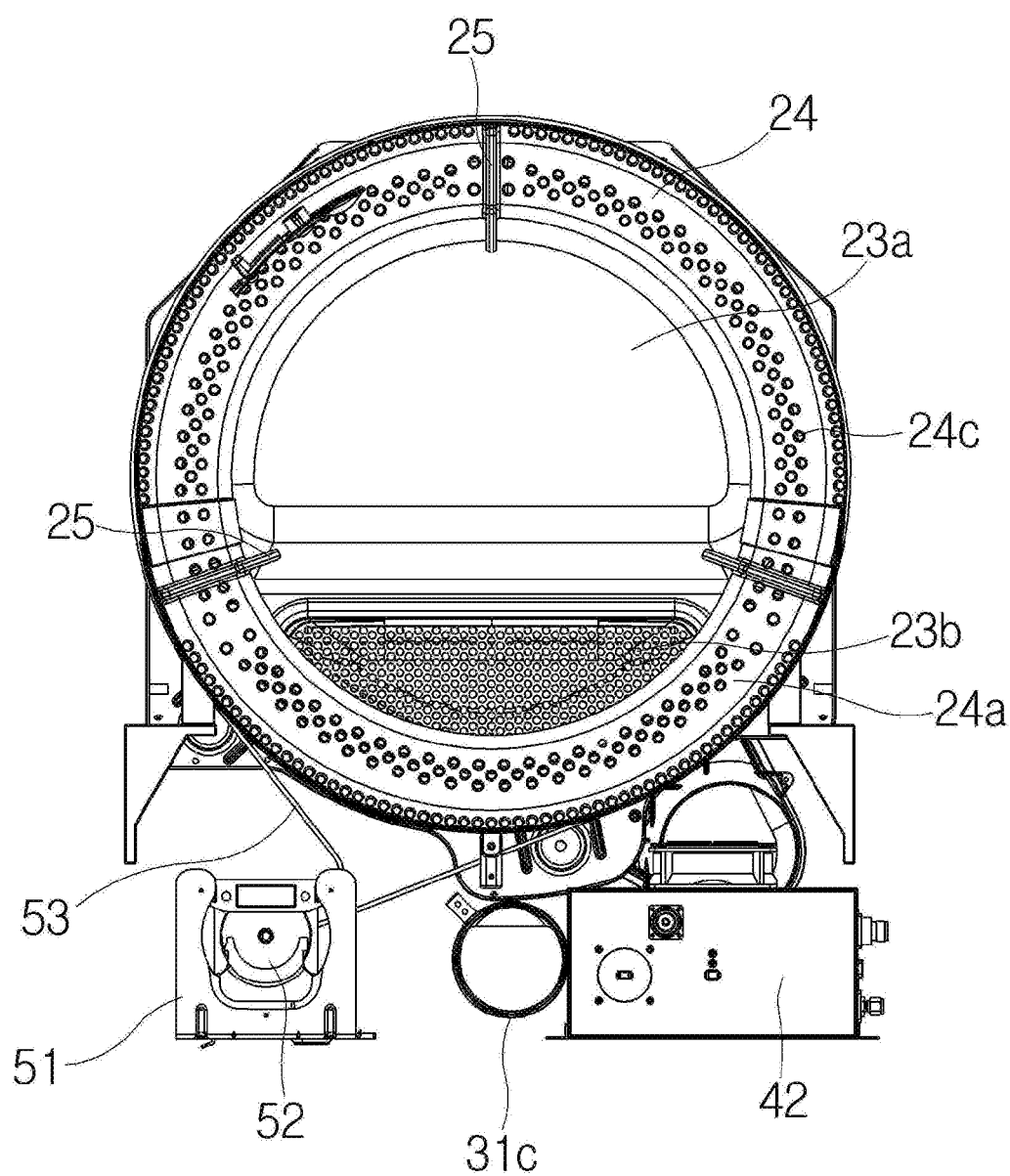
FIG. 8 is a diagram illustrating a front view of a state in which a cabinet is disassembled in the exemplary laundry drying machine.

FIG. 1 is a diagram illustrating an exemplary laundry drying machine, FIG. 2 is a diagram illustrating a view of the exemplary laundry drying machine of FIG. 1 from another angle, FIG. 3 is a diagram illustrating a cross-sectional view taken along line A-A in FIG. 2, FIG. 4 is a diagram illustrating a cross-sectional view taken along line B-B in FIG. 2, FIG. 5 is a diagram illustrating a partially enlarged view of the part A in FIG. 4, FIG. 6 is a diagram illustrating a view of a state in which a front panel, an upper panel, and a side panel are disassembled in the exemplary laundry drying machine, FIG. 7 is a diagram illustrating a rear view of a state in which a rear panel is disassembled in the exemplary laundry drying machine, FIG. 8 is a diagram illustrating a front view of a state in which a cabinet is disassembled in the exemplary laundry drying machine.

As shown in FIGS. 1 to 8, a cabinet 10 defining an outer body of a laundry drying machine 1 includes a front panel 11 constituting a front surface, a rear panel 12 constituting a rear surface, a pair of side panels 13 constituting side surfaces, an upper panel 14 constituting an upper surface, and a lower panel 15 constituting a lower surface of the laundry drying machine 1.

The front panel 11 can be provided with an inlet 111 provided to communicate with a drum 20 and a door 112 rotatably coupled to the cabinet 10 to open and close the inlet 111.

A control panel 117 can be provided on the front panel 11.

The control panel 117 can be provided with an input unit 118 to receive a control command from a user, a display unit 119 to output information such as the control command selectable by the user, and a main control unit to control a command for performing the operation of the laundry drying machine 1.

In some implementations, the input unit 118 can be configured to include a power supply request unit to request power supply to the laundry drying machine, a course input unit to allow a user to select a desired course among a plurality of courses, an execution request unit to request the start of the course selected by the user, and the like.

The display unit 119 can be configured to include at least one of a display panel capable of outputting characters and/or figures, and a speaker capable of outputting a voice signal and sound. The user can easily grasp the status of a current administrative status, a remaining time, and the like through the information output through the display unit 119.

Inside the cabinet 10, a drum 20 that is rotatably provided and defines a space for accommodating clothes (a target object), a duct part 30 that is configured to supply air to the drum 20 and exhaust the air inside the drum 20, and an electric field generator 40 that is configured to generate an electric field inside the drum 20 can be provided.

The drum 20 can include a cylindrical drum body 21 having an open front surface, a first support part 22 rotatably supporting the front surface of the drum body 21 inside the cabinet 10, and a second support part 23 rotatably supporting the rear surface of the drum body 21.

The inner space of the drum 20 is configured to function as a drying chamber in which drying is performed. In some implementations, the drum 20 can serve as a cathode electrode of a capacitor.

The first support part 22 can be configured to include a first fixed body 22a fixed to the inside of the cabinet 10 and a drum inlet 22b that is provided to pass through the first fixed body 22a to provide communication between the inlet 111 and the inside of the drum body 21.

The first fixed body 22a can be provided with an air outlet 22c communicating with the duct part 30.

As shown in FIG. 6, the air outlet 22c can be a passage that allows the internal air of the drum body 21 to move to the duct part 30, and can be provided as a through hole provided to pass through the first fixed body 22a.

The second support part 23 can be configured to include a second fixed body 23a fixed to the inside of the cabinet 10.

An air inlet 23b that is provided to pass through the second fixed body 23a and that provide communication between the inside of the drum body 21 and the inside of the cabinet 10 can be defined in the second support part 23.

The outer circumferential surface of the drum body 21 can include one or more notch parts 24 that are recessed along the circumferential direction. In some implementations, an anode electrode 41 can be spaced apart from each other at a predetermined interval in the notch part 24.

The cylindrical drum body 21 can rotate through various types of driving units 50.

For example, FIG. 3 illustrates that the driving unit 50 can include a drum motor 51 fixed inside the cabinet 10, a pulley 52 rotating by the drum motor 51, a belt 53 connecting the circumferential surface of the pulley 52 and the circumferential surface of the drum body 21.

In some implementations, the side panel 13 can be provided with a roller R for rotatably supporting the circumferential surface of the drum body 21.

In some implementations, a direct driven type driving unit in which the drum motor 51 is directly connected to the drum to rotate the drum without going through a pulley and a belt can also be applicable The duct part 30 can include an exhaust duct 31 connected to the air outlet 22c and a supply duct 32 connected to the air inlet 23b.

The exhaust duct 31 can be a passage for exhausting the air inside the drum body 21 to the outside of the cabinet 10. Accordingly, the water vapor generated from a target object can be exhausted to the outside of the cabinet 10 by the flow force of a circulation fan 33.

The exhaust duct 31 can include an air suction pipe 31a, a fan housing 31b, and an exhaust pipe 31c.

The air suction pipe 31a can be provided to communicate with the air outlet 22c, and can be a passage for guiding the air inside the drum 20 to the outside. In some implementations, the air suction pipe 31a can provide a flow path defined from the air outlet 22c downward in the gravity direction. For example, the air suction pipe 31a can be a pipe having a flat shape in the front-rear direction. In this case, the lower surface of the air suction pipe 31a can be inclined at a predetermined angle with the ground. In some implementations, the water that has passed through the air outlet 22c and then condensed on the inner surface of the air suction pipe 31a can be flowed down by its own weight and collected, and discharged to the outside of the laundry drying machine 1 by the flow force of the circulation fan 33. Accordingly, it is possible to block moisture from accumulating inside the air suction pipe 31a, thereby blocking the propagation of bacteria and the like.

The fan housing 31b can communicate with the air suction pipe 31a, and can have a cylindrical shape to accommodate the impeller 33a of the circulation fan 33. Accordingly, the air passing through the air suction pipe 31a can flow by the rotation of the impeller 33a and be exhausted to the outside of the laundry drying machine 1.

A first side of the exhaust pipe 31c can communicate with the fan housing 31b, and a second side may be disposed outside the laundry drying machine 1 through the rear panel 12. With this configuration, the air discharged from the fan housing 31b can be exhausted to the outside of the laundry drying machine 1 through the exhaust pipe 31c.

In addition, the duct part 30 can include the circulation fan 33 to move air along the exhaust duct 31. The circulation fan 33 can be provided to include the impeller 33a provided in the exhaust duct 31, and an impeller motor 33b to rotate the impeller 33a, and can provide a flow force to the air moving along the exhaust duct 31. For example, the impeller 33a can be accommodated in the fan housing 31b of the exhaust pipe 31c to provide the flow force to the air.

The supply duct 32 can be a passage for guiding the air outside the drum body 21 into the drum body 21. The supply duct 32 can communicate with the air inlet 23b to communicate the inside of the cabinet 10 with the drum body 21. With this configuration, when the circulation fan 33 is driven to generate a negative pressure inside the drum body 21, the air outside the drum body 21 passes through the supply duct 32, passes through the air inlet 23b, and can be introduced to the inside the drum body 21.

In some implementations, the air flowing inside the drum 20 may be indoor air, heated air, or a combination of both.

The electric field generator 40 can be various devices capable of generating an electric field inside the drum 20. For example, the electric field generator 40 can be a device that vibrates water molecules by using the electric field generated between the anode electrode and the cathode electrode for heating (dielectric heat) and evaporating.

Specifically, the electric field generator 40 can include an anode electrode 41 that generates an electric field with respect to the drum 20 serving as a cathode electrode.

The electric field generator 40 can include a matcher 42 connected to the anode electrode 41 to supply a current of a predetermined frequency to the anode electrode 41. The matcher 42 can be supported by being coupled to the lower panel 15.

The matcher 42 can be electrically connected to the anode electrode 41 to adjust the induction coefficient or capacitance to be tuned to a predetermined frequency. In addition, the matcher 42 can match the source impedance of the high frequency power with the impedance of load side. The matcher 42 can include a variable inductor and a variable capacitor. As for the detailed configuration of the matcher 42, any means known in the art can be applied, and a description of the detailed configuration will be omitted.

In some implementations, the matcher 42 can include a heat sink and a cooling fan 42a. With this configuration, the air inside the cabinet 10 can recover heat while passing through the heat sink, and the cooling fan 42a can make the heated air to be introduced into the cabinet 10, and the heated air can be introduced again into the drum 20 to support drying of the target object.

The electric field generator 40 can include a power supply unit 43 electrically connected to the matcher 42 to supply power.

The power supply unit 43 can be electrically connected to the matcher 42 to supply a constant frequency current to the anode electrode 41. Accordingly, when power is applied to the anode electrode 41, an electric field can be generated in the drum 20.

In some implementations, the power supply unit 43 can refer to RF power. The drum 20 can be connected to the power supply unit 43 of fixed frequency by the matcher 42 together with the control unit 100 to measure an appropriate power, drying, load size, and time setting for drying end and to perform the drying process. In this case, the preferred operation frequency of the power source is in the range of 1 MHz to 50 MHz.

RF power supply by the power supply unit 43 can be applied when the target object is tumbled and/or stopped.

In addition, the laundry drying machine 1 can further include a filter unit F for removing foreign substances such as lint and dust generated in the drying process of laundry such as clothes.

The electric field generator 40 can be directly controlled by the control unit 100.

The control unit 100 can be configured to control the operation of the laundry drying machine 1 based on a user input applied through the input unit 118. The control unit 100 may be composed of a printed circuit board and elements mounted on the printed circuit board. When the user inputs a control command such as selecting a clothes treatment course or operation of the laundry drying machine 1 through the input unit 118, the control unit 100 can control the operation of the laundry drying machine 1 according to a preset algorithm.

Figure 9:
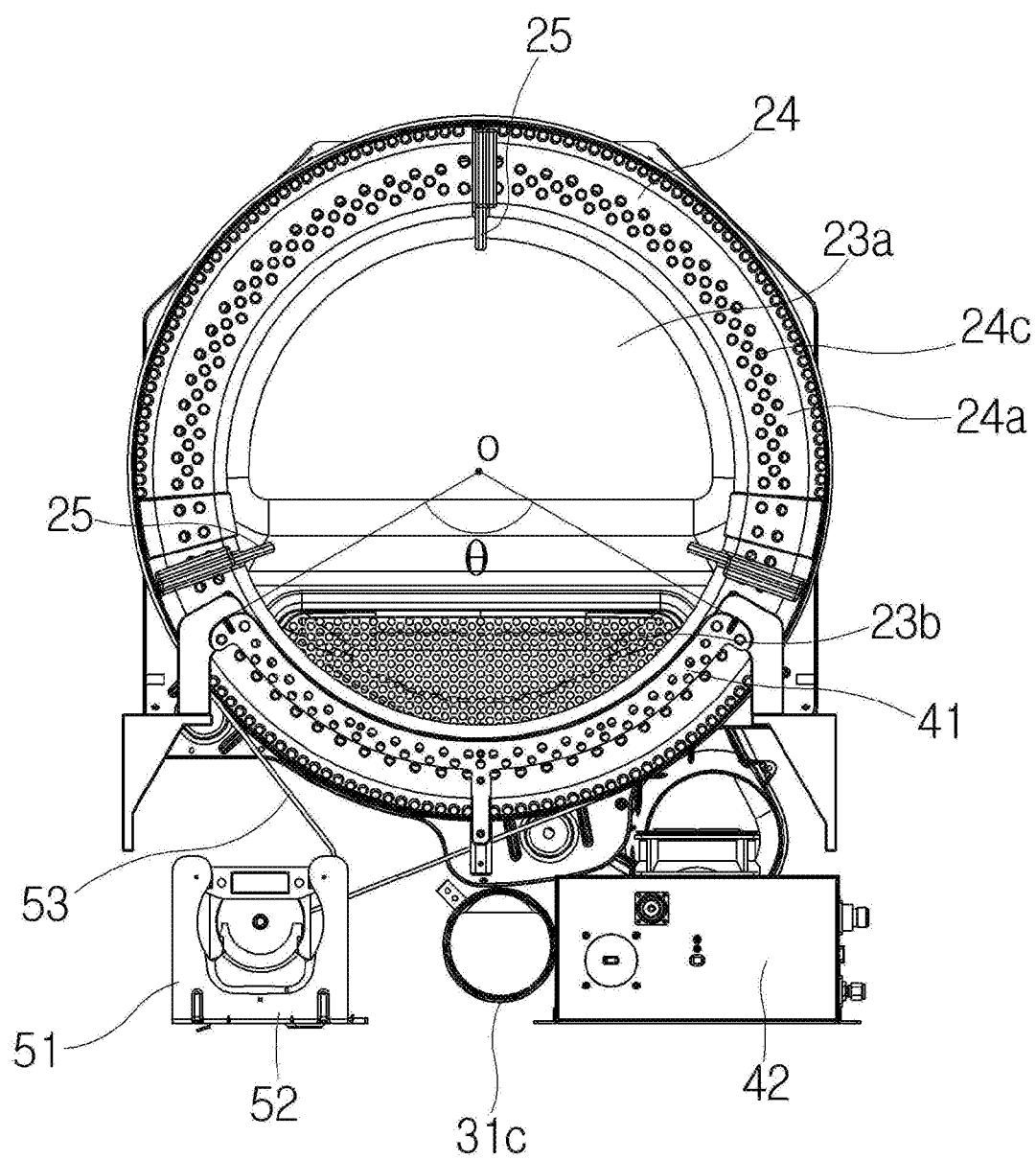
FIG. 9 is a diagram illustrating a front view of a partially disassembled state of a notch part in the exemplary laundry drying machine.
Figure 10:
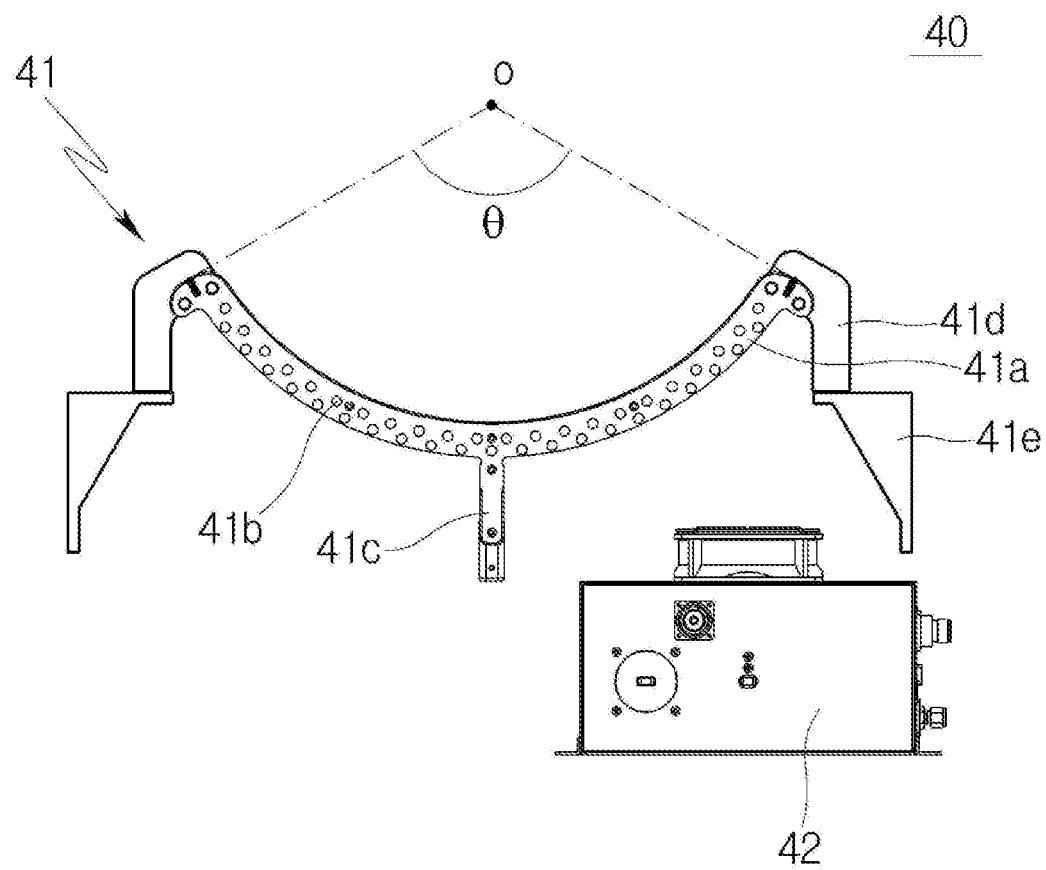
FIG. 10 is a diagram illustrating a front view for explaining an electric field generator in the exemplary laundry drying machine.
Figure 11:
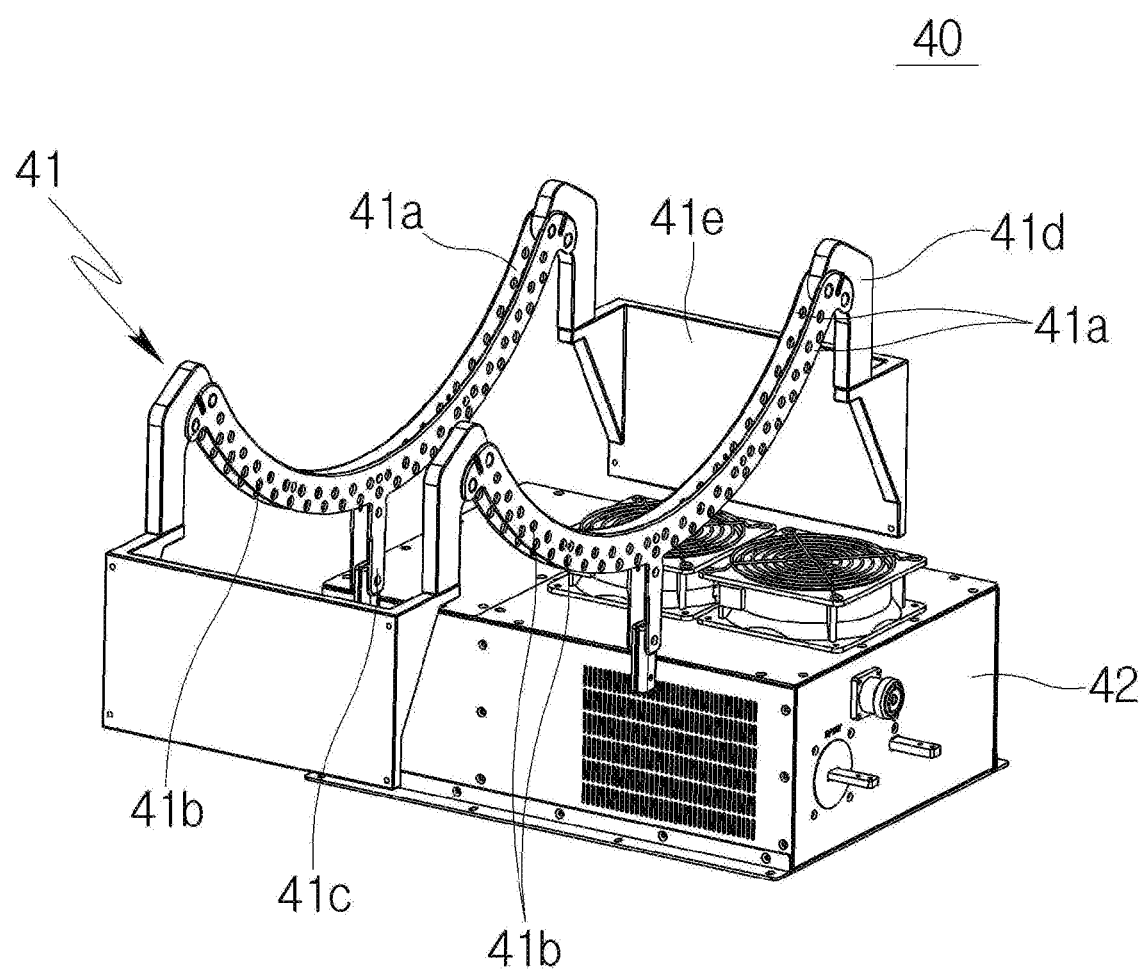
FIG. 11 is a diagram illustrating a perspective view of an electric field generator in the exemplary laundry drying machine.

FIG. 9 is a diagram illustrating a front view of a partially disassembled state of the notch part in the exemplary laundry drying machine, and FIG. 10 is a diagram illustrating a front view for explaining the electric field generator in the exemplary laundry drying machine. FIG. 11 is a diagram illustrating a perspective view for explaining the electric field generator in the exemplary laundry drying machine.

The configuration of the anode electrode 41 and the drum 20 in the laundry drying machine 1 will be described with reference to FIGS. 4, 5 and 9 to 11.

The drum 20 may include the drum body 21, the first support part 22, the second support part 23, the notch part 24, a lifter 25, and the ground electrode 26. Meanwhile, detailed descriptions of the first support part 22 and the second support part 23 will be omitted to avoid redundant description of the above description.

The drum body 21 can have a hollow shape so that the target object can be accommodated in the inner space. For example, the drum body 21 can have a cylindrical shape or a ring shape.

The notch part 24 can have a ring shape, and can be connected to the drum body 21 to rotate integrally.

In some implementations, the drum body 21 can be made of a plurality and can be coupled to the notch part 24, or can be integrally formed with the notch part 24.

Specifically, the notch part 24 can be formed by indenting a portion of the outer circumferential surface of the cylindrical drum body 21 inward in a radial direction.

In some implementations, the notch part 24 can include a connection part 24*a* that has an annular shape and that is connected to the drum body 21 and an anode electrode receiving part 24*b* that is curved inwardly in the radial direction at the connection part 24*a* and that defines a space for accommodating the anode electrode 41.

Accordingly, a portion of the drum 20 where the notch part 24 is formed can have a reduced diameter. For example, when viewed from the outside of the drum 20, the notch part 24 can be in the form of a groove concave inwardly along the circumferential direction on the outer circumferential surface of the drum body 21.

The drum body 21 can be alternately disposed with the notch part 24. For example, three drum bodies 21 can be provided, two notch parts 24 can be provided, and one notch part 24 can be disposed between the two drum bodies 21. That is, two notch parts 24 can be disposed at a predetermined distance from each other. However, the number of the notch parts 24 and the number of the drum bodies 21 are not limited thereto, and may be varied according to the overall size of the drum 20.

In some implementations, the notch part 24 can be provided with an air inlet 24*c* to communicate the inside of the drum body 21 with the inside of the cabinet 10. Accordingly, the air outside the drum 20 can be introduced into the drum 20 through the air inlet 24*c*.

Specifically, when the circulation fan 33 is driven and the air inside the drum 20 is suctioned into the exhaust duct 31, a negative pressure can be generated inside the drum 20, and the air outside the drum 20 can be forcibly introduced into the hollow of the drum 20 through the air inlet 24*c* of the notch part 24.

Such air flowing can quickly remove the water vapor evaporated from the target object. In addition, the air flow induces the evaporation of moisture inside the target object to additionally remove moisture from the target object. In addition, when power is applied to the anode electrode 41 and the matcher 42 to generate heat, it can be cooled to extend the lifespan.

In some implementations, at least one lifter 25 can be provided on the inner circumferential surface of the drum 20. For example, three lifters 25 can be provided at regular intervals (120 degrees). The lifter 25 can be fixedly coupled to the inner circumferential surface of the drum body 21 and the inner surface of the notch part 24, and can have a shape protruding from the inner circumferential surface of the drum body 21 and the inner surface of the notch part 24 toward the rotation axis of the drum 20. The lifter 25 can be provided to be in contact with the target object accommodated in the drum 20. With this configuration, when the drum 20 rotates, the target object can be rotated together with the drum 20 to a predetermined angle while being supported by the lifter 25, and then fall to the lower side by its own weight. In this process, the target object can be naturally mixed. That is, the target object can be agitated by the lifter 25, the tumble motion of the target object can be increased, and the target object can be heated uniformly while shaking about the rotation axis of the drum 20.

As a result, there is an effect that can suppress the occurrence of bunching on the target object by the lifter 25.

In some implementations, the rotating conductive drum 20 is connected to the ground electrode 26 by direct rotation or capacitive coupling connection. For example, the ground electrode 26 can be selectively activated or continuously connected only when RF power is applied.

The connection between the ground electrode and the drum body 21 can be continuously activated during movement. Alternatively, the connection between the ground electrode and the drum body 21 can be selectively connected when rotating or stopping.

The anode electrode 41 can include an anode electrode plate 41*a*, an air passage hole 41*b*, a support frame 41*c*, a coupling frame 41*d*, and a fixing panel 41*e*.

The anode electrode plate 41*a* can have an arc shape cut by a predetermined angle from the ring as well as a ring-shaped plate. For example, the anode electrode plate 41*a* can be disposed on a concentric circle with respect to the central axis of the drum body 21, and can be an arc-shaped plate formed over a range of 120 degrees with the rotation axis of the drum 20 as the origin. That is, the anode electrode 41 can have a ring shape cut by one third.

In some implementations, the anode electrode plate 41*a* can be configured as a pair and disposed to face each other.

In addition, both ends of the anode electrode plate 41*a* can be formed to extend outwardly in the radial direction to be fixedly coupled to a coupling frame 41*d*.

A plurality of air passage holes 41*b* can be defined in the anode electrode plate 41*a*, and can be defined to correspond to the position of the connection part 24*a* of the notch part 24. With this configuration, the air outside the drum 20 can be flowed into the drum 20.

Specifically, when the circulation fan 33 is driven and the air inside the drum 20 is suctioned into the exhaust duct 31, a negative pressure can be generated inside the drum 20, and the air outside the drum 20 can be forcibly introduced into the hollow of the drum 20 through the air passage hole 41*b*.

In addition, there is an effect of cooling the overheated anode electrode plate 41*a* while air passes through the anode electrode plate 41*a* through the air passage hole 41*b*.

The support frame 41*c* can be formed to extend downward in the direction of gravity from the anode electrode plate 41*a*. The support frame 41*c* can be in contact with the upper outer circumferential surface of the exhaust pipe 31*c* disposed on the lower side, and the anode electrode plate 41*a* can be supported by the support frame 41*c*.

The coupling frame 41*d* can be provided to couple a pair of anode electrode plates 41*a* to each other. Specifically, the coupling frame 41*d* can have a flat bar shape with one end bent, and the pair of anode electrode plates 41*a* can be fixedly coupled to both flat surfaces of the end bent, respectively. In some implementations, the bent angle of the coupling frame 41*d* can be formed to correspond to the shape of both ends of the anode electrode plate 41*a*.

Two coupling frames 41*d* can be provided to correspond to the positions of both ends of the anode electrode plate 41*a*. With this configuration, both ends of the pair of anode electrode plates 41*a* can be fixed to the coupling frame 41*d*.

The fixing panel 41*e* can have a flat plate shape, and both ends in the longitudinal direction can be coupled to the coupling frame 41*d*, respectively. Accordingly, the fixing panel 41*e* can fix the anode electrode plate 41*a* to maintain a constant distance. For example, the plurality of anode electrode plates 41*a* can maintain a predetermined distance by the fixing panel 41*e*, and can maintain a state spaced apart from the drum 20 by a predetermined distance even when the drum 20 rotates.

The anode electrode 41 can be disposed below the drum 20, and can be spaced apart from the drum body 21 and the notch part 24 at a predetermined distance.

The anode electrode 41 can be disposed to correspond to the position of the notch part 24 provided on the outer circumferential surface of the drum body 21.

With this configuration, when the target object is placed inside the drum 20, the anode electrode 41 can apply a sufficient electric field to the target object even if a plurality of target objects gather at the lower part of the drum body.

In addition, the anode electrode 41 can be disposed in the space of the notch part 24 formed concavely inwardly based on the outer circumferential surface of the drum body 21. For example, the anode electrode 41 can be disposed to correspond to two notch parts 24 formed with a predetermined interval therebetween. In some implementations, the two anode electrodes 41 can be fixed to the pair of fixing panels 41e so that the distance therebetween can be maintained.

With this arrangement, the anode electrode 41 and the outer circumferential surface of the drum body 21 serving as the cathode electrode can be alternately disposed along the axial direction.

In some implementations, the width and perimeter of the anode electrode 41 and their ratio can be changed.

The anode electrode 41 can be made of bare metal or insulating metal. An insulator can be coated on the anode electrode 41. In some implementations, the drum 20 can be made of a conductive material, that is, a metal, or an insulating material coated with a conductive layer.

In some implementations, the notch part 24 of the drum 20 is spaced apart from the anode electrode 41. Thus, the anode electrode 41 is spatially fixed, and the drum 20 can rotate. The drum 20 can freely rotate clockwise and counterclockwise about a rotation axis. In addition, since the drum 20 is not in contact with the anode electrode 41, the rotation speed can be freely changed.

For example, the anode electrode 41 and the drum 20 can be provided to be relatively rotatable. In some implementations, the target object (clothes) can be positioned between the fixed anode electrode 41 and the rotating conductive drum 20.

For example, the anode electrode 41 can be disposed in the space defined in the notch part 24 and can be disposed in a radial direction perpendicular to the outer circumferential surface of the drum body 21. Accordingly, the target object can be located in a space surrounded by the anode electrode 41 and the outer circumferential surface of the drum body 21 disposed perpendicular to each other.

With this configuration, when RF power is applied through the power supply unit 43, the electric field between the anode electrode 41 and the drum 20 can electrically penetrate the notch part 24 and the electric field can be formed in the inner space of the drum 20, and the moisture contained in the target object can be heated and evaporated while vibrating by the electric field.

More specifically, the anode electrode 41 can generate an RF (radio frequency) capacitive coupling effect by maintaining the electric field necessary for drying the target object in relation to the drum 20. That is, it is preferable to use a relatively low RF frequency in order to minimize parasitic capacitance generated in the drum 20 serving as the cathode electrode. For example, the frequency of 10 MHz or more and 15 MHz or less may be used for the anode electrode 41. In some implementations, in order to improve energy efficiency, it is preferable that the target object is located close to the drum 20 and the anode electrode 41. For example, the parasitic capacitance is independent of the capacitance of the target object itself, and can be defined as an arbitrary capacitance between the anode electrode 41 and the drum 20.

An AC current can be generated at a capacitive circuit through a semiconducting (wetting) load of the target object, and RF generation current of a single frequency can be applied to between at least one fixed anode electrode 41 and the rotating drum 20, so that the target object can be dielectrically heated.

Figure 12:
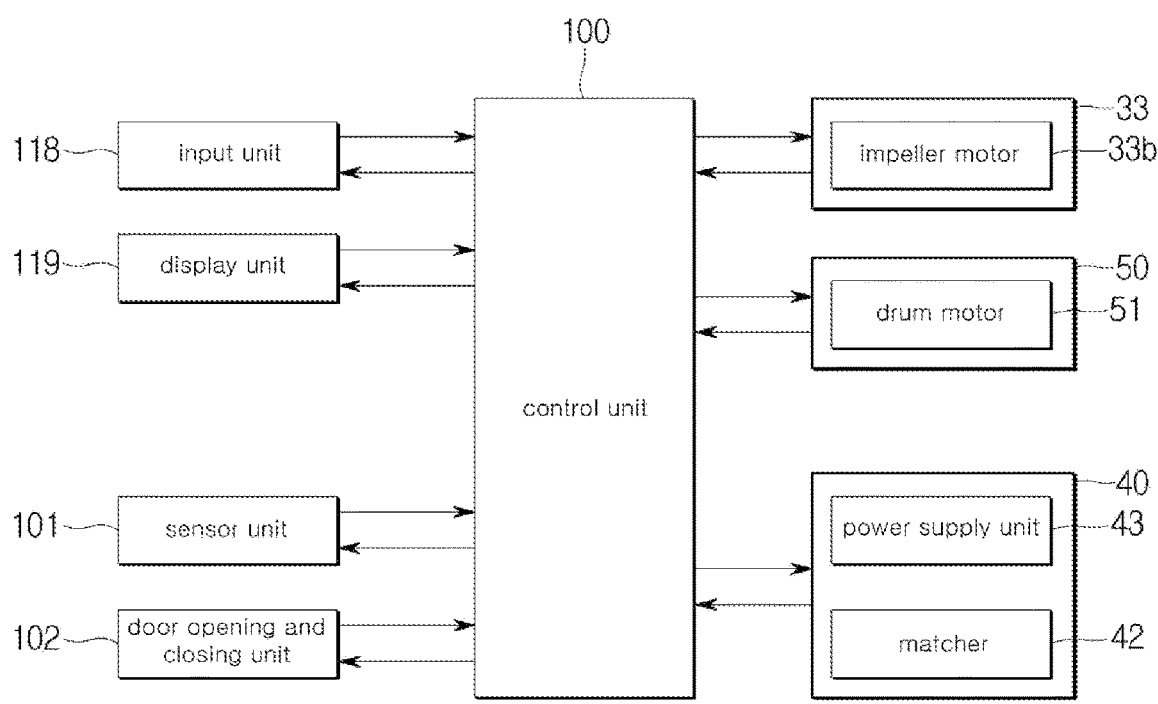
FIG. 12 is a block diagram for explaining a control configuration in the exemplary laundry drying machine.

FIG. 12 is a block diagram for explaining a control configuration in the exemplary laundry drying machine.

Referring to FIGS. 1 to 3 and 12, the configuration for control in the present disclosure will be described below.

First, the control unit 100 can be signally or electrically connected to the input unit 118 and the display unit 119. Accordingly, when a user inputs a control command to the input unit 118, the input unit 118 can transmit information regarding the control command to the control unit 100, and the control unit 100 can store the information. In addition, the control unit 100 can transmit the information regarding the control command input by the user to the display unit 119 to display the information to the user. In addition, the control unit 100 can transmit information such as the load of the target object, the drying progress status, and the time required for drying to the display unit so that the display unit 119 can notify the user.

In addition, the control unit 100 is connected to a sensor unit 101 and a door opening and closing unit 102. The sensor unit 101 can measure the temperature of the target object, the air flow within the drum 20, and the like. The door opening and closing unit 102 can notify the control unit 100 regarding whether the door 112 is opened or closed with respect to the drum 20, and can notify the control unit 100 of whether the door 112 is locked or unlocked when the door 112 is closed. In addition, the control unit 100 can transmit a control signal to the door opening and closing unit 102 to selectively open and close the door 112, and can transmit a control signal to selectively lock and unlock the door when the door is closed.

In addition, the control unit 100 can be connected to the drum motor 51. Accordingly, the control unit 100 can drive the drum motor 51 to rotate or stop the drum 20, control the rotation speed of the drum 20, and convert the rotation direction of the drum 20.

In addition, the rotation speed of the drum 20 can be tracked by the control unit 100. For example, the control unit tracks the rotation speed of the drum 20 to determine the optimal power tuning during the drying cycle as water is gradually evaporated from the target object.

In addition, the control unit 100 can be connected to the impeller motor 33b. Accordingly, the control unit 100 can rotate or stop the circulation fan 33 by driving the impeller motor 33b, and can control the rotation speed of the circulation fan 33. Accordingly, the control unit 100 can control the amount of air discharging in the drum 20.

In addition, the control unit 100 can control the electric field generator 40. For example, the control unit 100 can control the power supply unit 43 to supply power to the anode electrode 41, and can cut off the supplied power. Also, the control unit 100 can control the matcher 42 to match the source impedance and the impedance of load side. With this configuration, the control unit 100 can apply a stable electric field to the target object to dielectrically heat the target object.

Specifically, the control unit 100 can control to change at least one of RF power, impedance Z, RF reflection coefficient, VSWR, or the like in real time in order to transmit optimal energy to the target object. The control unit 100 can use these measurements to determine the type, size and wetting of the load, and the optimal time for ending the drying process.

In some implementations, the control unit 100 can transmit a notification signal or message to a user before drying starts and when the drying process is ended. The notification signal can be notified visually through the display unit 119 or audibly through a speaker as described above. The message may also be in the form of a text message sent to the user's mobile phone, for example using the SMS protocol.

Figure 13:
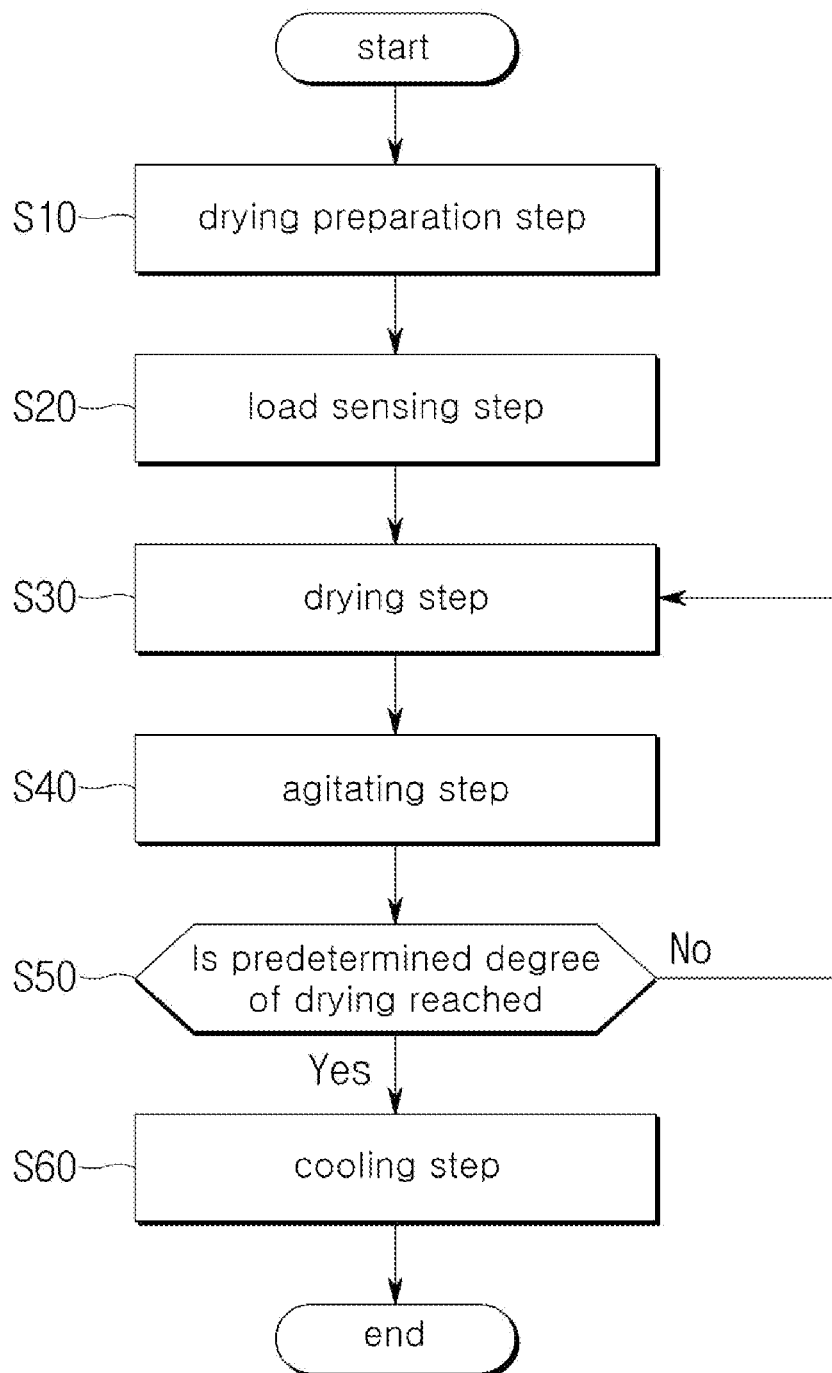
FIG. 13 is a flowchart illustrating a procedure according to a control method of the exemplary laundry drying machine.
Figure 16:
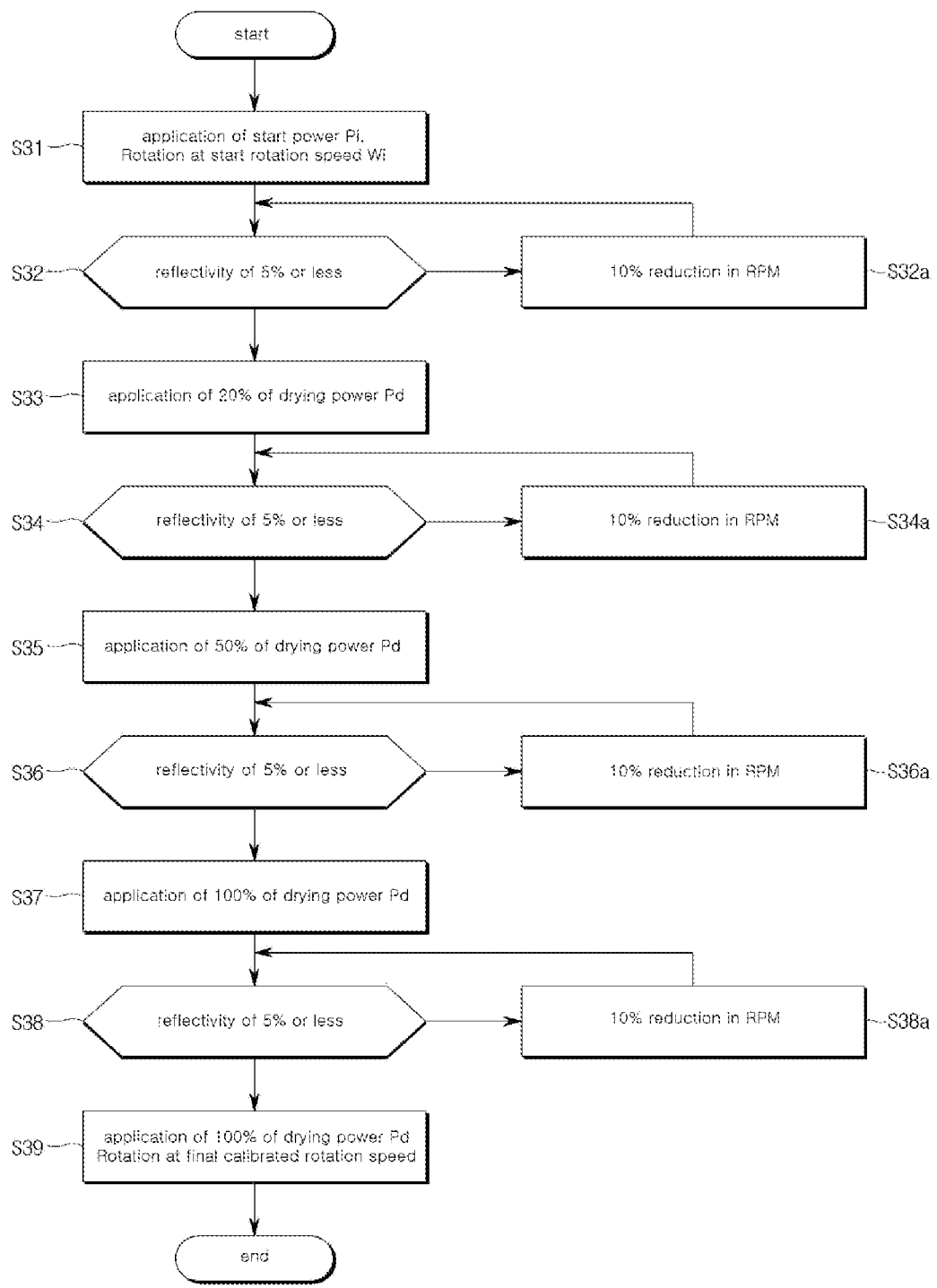
FIG. 16 is a flowchart for explaining a process of controlling a rotation speed of a drum and RF power for impedance matching during a drying process in a control method of the exemplary laundry drying machine.

FIG. 13 is a flowchart illustrating a procedure according to a control method of the exemplary laundry drying machine, and FIG. 16 is a flowchart for explaining a process of controlling the rotation speed of the drum and RF power for impedance matching during a drying process in a control method of the exemplary laundry drying machine.

A method of controlling the exemplary laundry drying machine will be described with reference to FIGS. 1 to 3 and FIGS. 9 to 16.

The control method of the laundry drying machine can include a drying preparation step (S10), a load sensing step (S20), a drying step (S30), an agitating step (S40), and a cooling step (S60).

In the drying preparation step (S10), the target object is accommodated in the drum 20, and a drying course can be set by a user's control input. When the target object is put into the drum 20, it is placed on the bottom of the drum 20 by gravity, and the target object comes into contact with the notch part 24 disposed adjacent to the anode electrode 41 and the drum body 21 having conductivity.

In the drying preparation step (S10), the user can input the information regarding the material and quantity of the target object through the input unit 118, and the input unit 118 can transmit this information to the control unit 100.

In this case, the information regarding the heat of vaporization for each material of the target object can be stored in advance in the control unit 100. Accordingly, the control unit 100 can set the amount of energy to be applied to the target object according to the material and size of the target object.

In the load sensing step (S20), the quantity of wash can be determined by sensing the load of the target object.

The quantity of wash can be determined by measuring the current value of the drum motor 51 while the drum 20 is rotating and sensing the load acting on the drum motor 51.

For example, when the drum 20 is controlled to rotate at a speed sensing a predetermined quantity of wash, a greater current is applied to the drum motor 51 as the quantity of wash increases. Accordingly, the control unit 100 can control the value of current applied to the drum motor 51. Accordingly, the control unit 100 can calculate the quantity of wash based on the sensed current value of the drum motor 51.

In some implementations, in the load sensing step (S20), the drum 20 can rotate at a preset agitating rotation speed $w_m$. The agitating rotation speed $w_m$ will be described in detail in the agitating step (S40).

In some implementations, the control unit 100 can prestore a moisture content according to the material of the target object. Accordingly, the control unit 100 can predict the evaporation time of moisture contained in the target object according to the amount of energy applied to the target object based on the information regarding the material and amount of the target object that is collected through the drying preparation step (S10) or the load sensing step (S20). In addition, the control unit 100 can transmit the predicted evaporation time of moisture to the display unit 119, and the display unit 119 can display the predicted time to the user.

In the drying step (S30), the control unit 100 can apply power to the anode electrode 41 and rotate the drum 20 to evaporate the moisture contained in the target object by dielectric heat.

Specifically, the control unit 100 can apply power to the anode electrode 41 to generate the electric field in relation to the drum 20 serving as the cathode electrode. In this state, RF power can be applied to the drum 20 and the target object. In some implementations, the current applied to the anode electrode 41 can be maintained at a predetermined frequency by the matcher 42, and the source impedance of the high frequency power supply and the impedance of load side can be continuously matched by the matcher 42.

The control unit 100 can control the matcher 42 and the power supply unit 43 to measure appropriate power, drying, load size, and drying end time, and perform the drying process. In some implementations, the preferred operation frequency of the power source can be in the range of 1 MHz to 50 MHz.

With this configuration, the anode electrode 41 can maintain the electric field necessary for drying the target object in relation to the drum 20 to generate a radio frequency (RF) capacitive coupling effect. In some implementations, it is preferable to use a relatively low RF frequency in order to minimize the parasitic capacitance generated in the drum 20 serving as the cathode electrode. For example, the frequency of 10 MHz or more and 15 MHz or less may be used for the anode electrode 41.

Therefore, it is possible to generate an AC current flow through the semi-conductive (wetting) load of the target object in a capacitive circuit, and the target object can be dielectrically heated by applying the RF generation current of a single frequency between at least one anode electrode 41 and the drum 20.

In the drying step (S30), the control unit 100 can apply RF power to the anode electrode 41 for a preset drying time td. For example, the control unit 100 can apply RF power to the anode electrode 41 for the time period of 80 seconds or more and 100 seconds or less, and preferably apply RF power to the anode electrode 41 for the time period of 90 seconds.

In some implementations, in the conventional dielectric heating type drying machine, when power is applied to an anode electrode, a drum is stopped without rotating. This enables continuous heating after the matcher performs impedance matching once at the start of drying, and thus, it is effective in heating the moisture contained in the target object at a high speed.

However, when the internal temperature of the target object rapidly increases as described above, there is a problem in that local overheating occurs inside the target object.

In particular, when the target object is a dyed synthetic fiber, there is a problem in that color transfer occurs due to local overheating. In the case of synthetic fibers, if the temperature exceeds 50 degrees Celsius, there is a possibility of color transfer.

In order to solve this problem, the conventional drying machine rotates the drum for 5 seconds to move the target object after drying for 90 seconds. However, since dielectric heating is performed again in a state in which the heat inside the target object is not sufficiently discharged, there is an issue that the internal temperature of the target object continuously increases as the drying cycle progresses.

Figure 14:
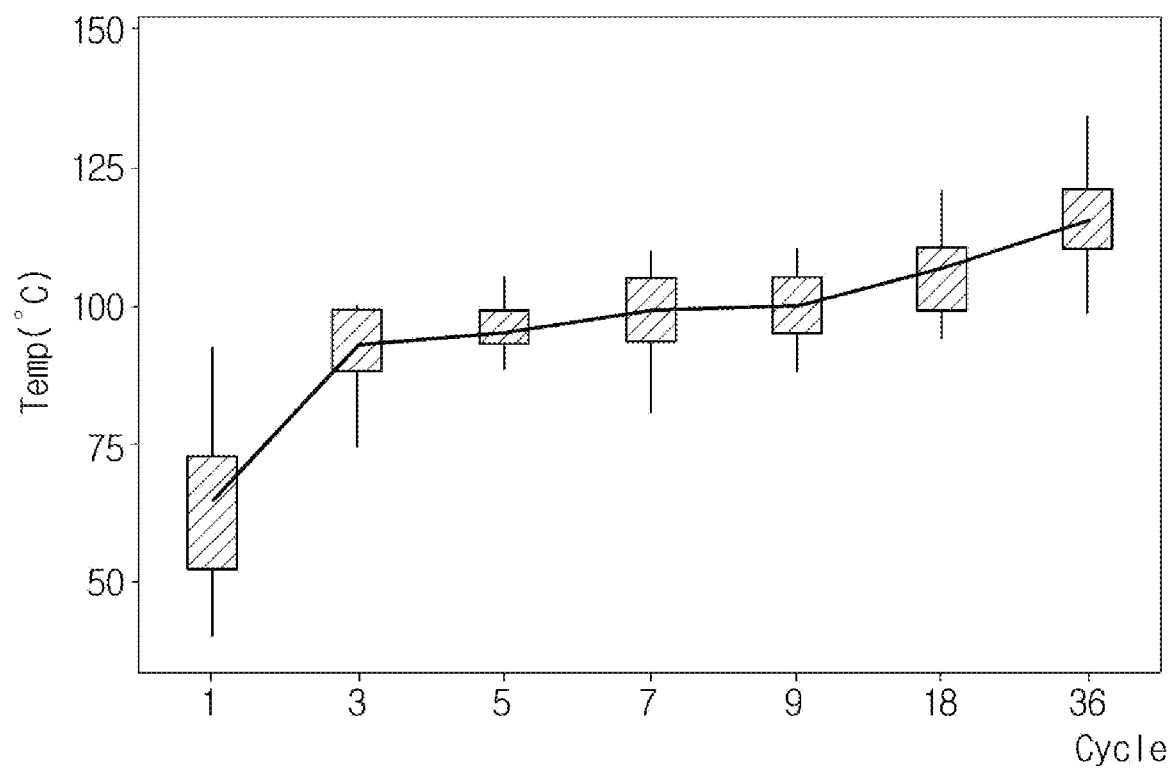
FIG. 14 is a graph showing a change in temperature of a target object in a conventional dielectric heating type laundry drying machine.

Considering the temperature change of the target object with reference to FIG. 14, the temperature change inside the target object when the target object is dried by the conventional dielectric heating method. The process for applying RF power 90 seconds while the drum is stopped, stopping the RF power application for 5 seconds, and rotating the drum is repeated 36 cycles, and as a result, the temperature inside the target object rises to 145 degrees Celsius.

In addition, in the case of heating after sufficiently discharging internal heat, the energy and time required for performing the dielectric heating again are large, so there is a problem in that the drying efficiency is decreased.

Therefore, it is necessary to control so that local overheating does not occur while maintaining heating of the target object.

In order to solve this problem, in the drying step (S30), the control unit 100 can rotate the drum 20 while power is applied to the anode electrode 41. For example, in the drying step (S30), the control unit 100 can rotate the drum 20 at a preset drying rotation speed wd.

In some implementations, the rotation speed of the drum 20 is slower than the rotation speed of the drum 20 in the load sensing step (S20) or the rotation speed of the drum 20 in the agitating step (S40).

For example, the rotation speed range of the drum 20 in the drying step (S30) may be determined from two viewpoints.

First, the rotation speed of the drum 20 at which local overheating does not occur in the drying step (S30) is derived as described below.

To limit color transfer to the target object, the temperature of the target object should be maintained at 50 degrees Celsius or less. To this end, it is necessary to keep the temperature increase per heating time low. The amount of temperature increase per unit time is as follows.

$$\frac{\Delta T}{\Delta t} = \frac{P_v}{C_p \cdot \rho} = \frac{55.63 \times 10^{-12} \cdot f \cdot E^2 \cdot \varepsilon''}{C_p \cdot \rho} \quad \text{[Equation 1]}$$

In this case, $\Delta T$ may refer to an amount of temperature increase (° C.), and $\Delta t$ may refer to heating time (seconds). In addition, Cp may refer to the specific heat of the dielectric (J/kg·K), f may refer to a frequency (Hz), $\rho$ may refer to the density of the dielectric (kg/m³), and $\varepsilon_0$ may refer to a dielectric constant in a vacuum state.

In some implementations, Pv is a power absorbed per unit volume depending on the dielectric, and it can be expressed as the following equation.

$$P_v = 2\pi \cdot f \cdot \varepsilon_0 \cdot \varepsilon'' E^2 \quad \text{[Equation 2]}$$

In this case, $\varepsilon''$ may refer to a relative electric loss factor, and E may refer to an electron density.

In some implementations, when the above equations 1 and 2 are combined in consideration of the moving distance according to the rotation of the drum 20, the following equation is obtained.

$$\Delta T = \frac{55.63 \times 10^{-12} \cdot f \cdot E^2 \cdot \varepsilon'' \cdot 30 \cdot \theta}{C_p \cdot \rho \cdot \pi \cdot \alpha} \quad \text{[Equation 3]}$$

When an outside temperature is 20 degrees Celsius, a temperature change must be 30 degrees or less in order to maintain the temperature of the target object at 50 degrees Celsius or less. Accordingly, the minimum rotation speed of the drum 20 in the drying step (S30) is determined by the following equation.

$$\alpha > \frac{55.63 \times 10^{-12} \cdot f \cdot E^2 \cdot \varepsilon'' \cdot \theta}{C_p \cdot \pi \cdot \rho} \quad \text{[Equation 4]}$$

In some implementations, $\theta$(rad) denotes an angle at which the anode electrode 41 is disposed with respect to the rotation axis of the drum 20, and a denotes the rotation speed of the drum 20. Accordingly, the rotation speed of the drum 20 may be proportional to the angle occupied by the anode electrode 41 with respect to the rotational axis of the drum 20.

For example, if RF power of 4000 W having a frequency of 13.56 MHz is applied to the anode electrode, and the arc-shaped anode electrode 41 surrounds the drum 20 at an angle (range) of 120 degrees ($2\pi/3$), the minimum rotation speed in the drying step (S30) is 1.6 rpm. In addition, considering that the minimum rotation speed a of the drum 20 is proportional to $\theta$ (rad), the proportionality between the angle of the anode electrode 41 surrounding the drum 20 and the minimum rotation speed of the drum 20 is as follows.

$$\alpha > \frac{12\theta}{5\pi} \quad \text{[Equation 5]}$$

For example, the minimum rotation speed of the drum 20 is $12/5\pi$ times the angle at which the anode electrode 41 surrounds the drum 20 with the rotation axis of the drum 20 as the origin.

In some implementations, in the drying step (S30), the control unit 100 can rotate the drum 20 while maintaining the rotation speed of the drum 20 at 7 rpm or less.

Specifically, in the dielectric heating type RF drying machine, as the rotation speed of the drum 20 increases, the load increases, and it becomes difficult for the matcher 42 to match the source impedance and the impedance of load side. Accordingly, when the rotation speed of the drum 20 exceeds 7 rpm, the inside of the target object may not be dielectrically heated.

As a result, in the drying step (S30), the control unit 100 can rotate the drum 20 at $12/5\pi$ times or more of the angle at which the anode electrode 41 surrounds the drum 20, and a rotation speed of 7 rpm or less.

With this configuration, the control method of the exemplary laundry drying machine has the effect of limiting the occurrence of color transfer by maintaining the temperature of the target object at 50 degrees Celsius or less while removing moisture from the target object by dielectric heating the inside of the target object.

In addition, in this method, it takes for the matcher 42 to match the impedance in order to supply the RF power again, which is about 7 seconds. Therefore, there is a problem in that power may be wasted in this process, and the overall drying time increases.

In order to solve this problem, in the drying step (S30), the control unit 100 can rotate the drum 20 while power is applied to the anode electrode 41. In this case, the rotation speed of the drum 20 may be slower than the rotation speed of the drum 20 in the load sensing step (S20) or the rotation speed of the drum 20 in the agitating step (S40).

In addition, in the drying step (S30), the control unit 100 can decrease the rotation speed of the drum when the reflectivity of the electric field exceeds a predetermined ratio, and the control unit can increase the power to be applied to the anode electrode when the reflectivity of the electric field is less than or equal to a predetermined ratio.

Specifically, the drying step (S30) includes a drying entry step (S31), a first power increasing step (S33), a second power increasing step (S35), a third power increasing step (S37), and a rotation maintaining step (S39) as described with respect to FIG. 16.

In the drying entry step (S31), the control unit 100 can apply a preset start power Pi to the anode electrode 41 and rotate the drum 20 at a preset start rotation speed Wi. For example, the power supply unit 43 can apply power corresponding to the preset start power Pi to the anode electrode 41 when the application of the power to the anode electrode 41 is started according to the control command of the control unit 100.

For example, in the drying entry step (S31), the control unit 100 can apply the power of 100 W or more and 200 W or less to the anode electrode 41 through the power supply unit 43, and rotate the drum 20 at a rotation speed of 5 rpm or more and 10 rpm or less.

After the drying entry step (S31), the control unit 100 can obtain the reflectivity through the matcher 42. For example, the matcher 42 can measure the reflected wave of the electric field that is reflected from the target object and returns, and the control unit 100 compares it with the incident wave of the electric field generated at the anode electrode 41 to obtain the reflectivity of the electric field (S32).

In this case, when the reflectivity of the electric field exceeds a predetermined ratio, the control unit 100 can reduce the rotation speed of the drum 20. For example, when the reflectivity of the electric field exceeds 5%, the rotation speed of the drum 20 can be reduced by 10% (S32a). That is, the rotation speed W of the drum 20 may be 90% of the start rotation speed (W=0.9×Wi).

Then, the control unit 100 may repeat the process of reducing the rotation speed of the drum 20 until the reflectivity of the electric field of the drum 20 is less than or equal to a predetermined ratio. If the rotation speed is decelerated n times, the rotation speed W of the drum 20 may be $(0.9)^n \times Wi$ (W=$(0.9)^n \times Wi$).

In some implementations, when the reflectivity of the electric field is less than or equal to a predetermined ratio, the control unit 100 can perform the first power increasing step (S33). For example, when the reflectivity of the electric field is 5% or less, the first power increasing step (S33) can be performed.

In the first power increasing step (S33), the control unit 100 can increase the power P applied to the anode electrode 41. For example, when the reflectivity of the electric field is 5% or less, the control unit 100 can transmit RF power (P=0.2×Pd) corresponding to 20% of a preset drying power Pd through the power supply unit 43 to the anode electrode 41.

In some implementations, the rotation speed W1 of the drum 20 in the first power increasing step (S33) can maintain the rotation speed W of the drum 20 in the immediately preceding step. For example, if the rotation speed of the drum 20 is reduced after the drying entry step (S31), the reduced rotation speed (W1=$(0.9)^n \times Wi$) of the drum 20 is maintained, and if the rotation speed of the drum 20 is not reduced after the drying entry step (S31), the start rotation speed (W1=Wi) may be maintained.

When the reflectivity of the electric field is less than or equal to a predetermined ratio, the power corresponding to 20% of the preset drying power may be applied to the anode electrode.

After the first power increasing step (S33), the control unit 100 can obtain a reflectivity through the matcher 42. For example, the matcher 42 can measure the reflected wave of the electric field that is reflected from the target object and returns, and the control unit 100 compares it with the incident wave of the electric field generated from the anode electrode 41 to obtain the reflectivity of the electric field (S34).

In this case, when the reflectivity of the electric field exceeds a predetermined ratio, the control unit 100 can reduce the rotation speed W of the drum 20. For example, when the reflectivity of the electric field exceeds 5%, the rotation speed of the drum 20 may be reduced by 10% (S34a). That is, the rotation speed W of the drum 20 may be 90% of the start rotation speed (W=0.9×W1).

Then, the control unit 100 may repeat the process of reducing the rotation speed of the drum 20 until the reflectivity of the electric field of the drum 20 is less than or equal to a predetermined ratio. If the rotation speed is decelerated n times, the rotation speed W of the drum 20 may be $(0.9)^n \times W1$ (W=$(0.9)^n \times W1$).

In some implementations, when the reflectivity of the electric field is less than or equal to a predetermined ratio, the control unit 100 can perform the second power increasing step (S35). For example, when the reflectivity of the electric field is 5% or less, the second power increasing step (S35) can be performed.

In the second power increasing step (S35), the control unit 100 can increase the power P applied to the anode electrode 41. That is, the power supply unit 43 can apply the power corresponding to 50% of the drying power Pd to the anode electrode 41 according to the control command of the control unit 100 when the power being applied to the anode electrode 41 corresponds to 20% of the drying power Pd and the reflectivity of the electric field is less than or equal to a predetermined ratio.

For example, when the reflectivity of the electric field is 5% or less, the control unit 100 can apply RF power (P=0.5×Pd) corresponding to 50% of the preset drying power Pd through the power supply unit 43 to the anode electrode 41.

In some implementations, the rotation speed W2 of the drum 20 in the second power increasing step (S35) can maintain the rotation speed W of the drum 20 in the immediately preceding step. For example, if the rotation speed of the drum 20 is reduced, the reduced rotation speed of the drum 20 is maintained (W2=$(0.9)^n \times W1$), and if there is no rotation speed reduction after the drying entry step (S31), the start rotation speed Wi can be maintained (W2=Wi).

After the second power increasing step (S35), the control unit 100 can obtain a reflectivity through the matcher 42. That is, the matcher 42 can measure the reflected wave of the electric field that is reflected from the target object and returns, and the control unit 100 compares it with the incident wave of the electric field generated from the anode electrode 41 to obtain the reflectivity of the electric field (S36).

In this case, when the reflectivity of the electric field exceeds a predetermined ratio, the control unit 100 can reduce the rotation speed W of the drum 20. For example, when the reflectivity of the electric field exceeds 5%, the rotation speed of the drum 20 may be reduced by 10% (S36a). That is, the rotation speed W of the drum 20 may be 90% of the start rotation speed (W=0.9×W2).

Then, the control unit 100 may repeat the process of reducing the rotation speed of the drum 20 until the reflectivity of the electric field of the drum 20 is less than or equal to a predetermined ratio. If the rotation speed is reduced by n times, the rotation speed W of the drum 20 may be $(0.9)^n \times W2$ (W=$(0.9)^n \times W2$).

In some implementations, when the reflectivity of the electric field is less than or equal to a predetermined ratio, the control unit 100 can perform the third power increasing step (S37). For example, when the reflectivity of the electric field is 5% or less, the third power increasing step (S37) may be performed.

In the third power increasing step (S37), the control unit 100 can increase the power P applied to the anode electrode 41. That is, the power supply unit 43 can apply the power corresponding to 100% of the drying power Pd according to the control command of the control unit 100 when the power being applied to the anode electrode 41 corresponds to 50% of the drying power (Pd) and the reflectivity of the electric field is less than or equal to predetermined ratio. For example, when the reflectivity of the electric field is 5% or less, the control unit 100 can apply a preset drying power Pd to the anode electrode 41 through the power supply unit 43. For example, the drying power Pd may be 4000 W.

In some implementations, the rotation speed W3 of the drum 20 in the third power increasing step (S37) can maintain the rotation speed W of the drum 20 in the immediately preceding step. That is, if the rotation speed of the drum 20 is reduced, the reduced rotation speed of the drum 20 is maintained (W3=$(0.9)^n \times$W2), and If there is no rotation speed reduction after the drying entry step (S31), the start rotation speed Wi can be maintained (W3=Wi).

After the third power increasing step (S37), the control unit 100 can obtain a reflectivity through the matcher 42. That is, the matcher 42 can measure the reflected wave of the electric field that is reflected from the target object and returns, and the control unit 100 compares it with the incident wave of the electric field generated from the anode electrode 41 to obtain the reflectivity of the electric field (S38).

In this case, when the reflectivity of the electric field exceeds a predetermined ratio, the control unit 100 can decrease the rotation speed W of the drum 20. For example, when the reflectivity of the electric field exceeds 5%, the rotation speed of the drum 20 may be reduced by 10% (S38a). That is, the rotation speed W of the drum 20 may be 90% of the start rotation speed (W=0.9×W3).

Then, the control unit 100 may repeat the process of reducing the rotation speed of the drum 20 until the reflectivity of the electric field of the drum 20 is less than or equal to a predetermined ratio. If the rotation speed is reduced by n times, the rotation speed W of the drum 20 may be $(0.9)^n \times$W3 (W=$(0.9)^n \times$W3).

In some implementations, when the reflectivity of the electric field is less than or equal to a predetermined ratio, the control unit 100 can perform the rotation maintaining step (S39). For example, when the reflectivity of the electric field is 5% or less, the rotation maintaining step (S39) may be performed.

In the rotation maintaining step (S39), the control unit 100 can apply the drying power Pd to the anode electrode 41 and maintain the rotation speed of the drum 20 to dry the target object. That is, when the drying power Pd is applied to the anode electrode 41 and the reflectivity of the electric field reflected from the target object is less than or equal to a predetermined ratio, the control unit 100 may maintain the rotation speed of the drum 20.

Specifically, in the rotation maintaining step S39, the control unit 100 can continuously maintain the drying power Pd applied to the anode electrode 41 in the third power increasing step (S37). In addition, the final rotation speed Wf of the drum 20 in the rotation maintaining step (S39) may maintain the rotation speed W of the drum 20 in the immediately preceding step. That is, if the rotation speed of the drum 20 is reduced in the previous step, the reduced rotation speed of the drum 20 is maintained (Wf=$(0.9)^n \times$W3), and if there is no reduction in the drum 20 after the drying entry step (S31), the start rotation speed Wi can be maintained (Wf=Wi).

With this configuration, the control method of the exemplary laundry drying machine has the effects of removing moisture from the target object by dielectrically heating the inside of the target object, limiting the occurrence of local overheating in the target object through the rotation of the drum 20, and limiting the occurrence of color transfer by maintaining the temperature of the target object at 50 degrees Celsius or less.

In particular, in the dielectric heating type drying machine in which the anode electrode 41 is fixed and the drum 20 rotates, the control method of the exemplary laundry drying machine can have an effect of heating the target object accommodated in the drum while rotating the drum.

In this case, since the drying process can be started immediately without a time for separate impedance matching by controlling the rotation speed and RF power of the drum to lower the reflectivity of the electric field, there is an effect of saving time and energy required for impedance matching.

In addition, there is an effect of limiting damage to equipment such as a matcher due to the reflected wave.

In addition, in the drying step (S30), the target object can be in contact with the lifter 25 at least once by the rotation of the drum 20, and the effect of limiting local overheating while the target object is moved by the lifter 25 can be increased.

In some implementations, in the drying step (S30), the control unit 100 can drive the circulation fan 33 to discharge the humid air present in the drum 20 to an outside. In some implementations, the air outside the drum 20 may be introduced into the drum 20.

With this configuration, the water vapor of the target object can be induced to be evaporated by the air flow. In addition, the overheated anode electrode 41 and the matcher 42 can be cooled by this air flow.

In some implementations, in the drying step (S30), the control unit 100 can measure the temperature of the target object through the sensor unit 101, and when the temperature of the target object is equal to or higher than a preset reference temperature, the control unit can control the rotation speed of the drum 20 and maintain the internal temperature of the target object at 50 degrees or less.

In some implementations, in the agitating step (S40), the control unit 100 can cut off the power applied to the anode electrode 41 and rotate the drum 20 to move the target object.

Specifically, in the agitating step (S40), the control unit 100 can cut off the power applied in the drying step (S30) to stop the dielectric heating, and the drum 20 can be rotated at a preset agitating rotation speed $w_m$.

With this configuration, it is possible to limit overheating due to long-term use of the power supply unit 43, and at the same time, there is an effect that the target object can be moved and heated uniformly.

In this case, the rotation speed of the drum 20 in the agitating step (S40) rotates the drum 20 at a faster speed than the rotation speed of the drum 20 in the drying step (S30). That is, the drying rotation speed wd is smaller than the agitating rotation speed $w_m$. As an example, the agitating rotation speed $w_m$ may be 30 rpm.

In contrast, in the conventional hot air supply type drying machine, the drum is constantly rotated at 50 rpm so that the hot air is uniformly supplied to the target object during the drying process.

In this case, the target object is rotated by centrifugal force and moved upwards inside the drum, and it is dropped by gravity. In this case, the drying performance may be increased by increasing the contact area with the hot air while the target object is falling, but there is an issue that the target object shrinks due to mechanical force.

Contrary to this, in a dielectric heating type drying machine in which the inside of the target object is heated, it is necessary to move and heat the target object uniformly, but it is not necessary to generate a falling motion that causes the shrinkage of the target object.

For example, in the dielectric heating type drying machine, it is necessary to reduce the shrinkage of the target object by blocking the target object from falling in the process of moving the target object.

In order to solve this problem, in the agitating step (S40), the control unit 100 can control the drum motor 51 to rotate the drum 20 at a rotation speed of less than 50 rpm. For example, the agitating rotation speed $w_m$ in the agitating step (S40) can be less than 50 rpm.

Specifically, the agitating rotation speed $w_m$ that causes the target object to slide along the inner circumferential surface of the drum 20 without performing a falling motion in the agitating step (S40) can be obtained as follows.

When the drum motor 51 is driven by the command of the control unit 100 in the agitating step (S40), the drum 20 rotates about the rotation axis, and the target object may move along the inner circumferential surface of the drum 20.

For example, the rotation shaft of the drum 20 may be disposed parallel to the ground, or may be disposed at a predetermined angle with the ground. In this case, when the target object is put into the drum 20, the target object is gathered in a part close to the ground in the drum 20 by gravity. In addition, at least a part of the target object is in contact with the inner circumferential surface of the drum 20. In addition, the target object is in a state in which the inner circumferential surface of the drum 20 is pressed by weight.

When the drum 20 starts to rotate, the inner circumferential surface of the drum 20 that is in contact with the target object starts to rotate. In this case, the target object also rotates about the rotation shaft of the drum 20 together with the inner circumferential surface of the drum 20 by the force of the target object pressing the inner circumferential surface of the drum 20 by gravity or inertia force.

In this case, the maximum speed that the target object can have may be the speed of the drum 20. However, the speed of the target object may be reduced by gravity, air resistance, and the like.

As a result, when the radius of the drum 20 is r, the maximum speed v of the target object contained in the drum 20 rotating at the agitating rotation speed $w_m$ is the product ($v = r \times w_m$) of the radius r of the drum 20 and the agitating rotation speed $w_m$.

Therefore, when the mass of the target object is m, the maximum kinetic energy (Ek) of the target object in the agitating step (S40) is as follows.

$$Ek = \frac{1}{2} \cdot mr^2 w_m^2$$

In some implementations, when the target object moves upward in the direction of gravity along the inner circumferential surface of the drum by the rotation of the drum 20, potential energy Ep may be generated by the difference in height h from the point close to the ground to the position where the target object is moved in the drum 20. Therefore, the potential energy Ep when the target object is moved by the drum is as follows.

$$Ep = mgh$$

In this case, in order to move the target object downward, the potential energy Ep must be greater than the kinetic energy Ek (Ep>Ek).

$$mgh > \frac{1}{2} \cdot mr^2 w_m^2$$

In addition, even if the potential energy Ep is greater than the kinetic energy Ek, a fall due to gravity may occur in the case where the point is too high inside the drum 20. Thus, at an appropriate height h the potential energy Ep must be greater than the kinetic energy Ek. That is, when considering the cross section (circle) of the drum 20 as a reference, a falling motion occurs due to gravity in the case where even a part of the target object moves to the upper semicircular region of the drum 20. Thus, the entire target object has to have the potential energy Ep greater than the kinetic energy Ek in the lower semicircle region of the drum 20.

In this case, the anode electrode 41 is formed over a range of 120 degrees with respect to the rotation axis of the drum 20, and heating of the target object is made within the range of the anode electrode 41, it can be seen that the target object is spread over a range of up to 120 degrees with respect to the rotation axis of the drum 20. That is, it can be seen that it is spread symmetrically in the range of 60 degrees based on the vertical line. Therefore, in order for all the target objects to be located in the lower semicircular region of the drum 20, the target objects must be moved only within a range of 30 degrees based on the rotation axis of the drum 20.

The height h in this case is summarized using the radius r of the drum 20 as follows.

$$r\left(1 - \frac{\sqrt{3}}{2}\right) \geq h$$

Therefore, if the above equations are arranged, the agitating rotation speed $w_m$ may have the following range.

$$w_m^2 \leq \frac{2g\left(1 - \frac{\sqrt{3}}{2}\right)}{r}$$

That is, the square of the agitating rotation speed may be set in inverse proportion to the radius of the drum.

The value obtained by multiplying the radius of the drum and the square of the agitating rotation speed (rad/s) may be 0.27 times or less of the magnitude of the gravitational acceleration.

For example, if the radius r of the drum 20 is 30 cm, the agitating rotation speed $w_m$ may be about 28.4 rpm.

However, the above range may refer that the speed of the target object is not reduced due to gravity, air resistance, and the like, and when the moving speed of the target object is reduced due to gravity, air resistance, and the like, the falling motion of the target object may not occur even in the increasing of the agitating rotation speed $w_m$. Accordingly, the difference in rotation speed in this regard is included in the spirit and scope of the present disclosure.

Accordingly, the agitating rotation speed $w_m$ at which the falling motion of the target object does not substantially occur may be 30 rpm or less.

With this configuration, the target object can slide along the inner circumferential surface of the drum when the drum 20 rotates at the agitating rotation speed $w_m$.

Figure 17:
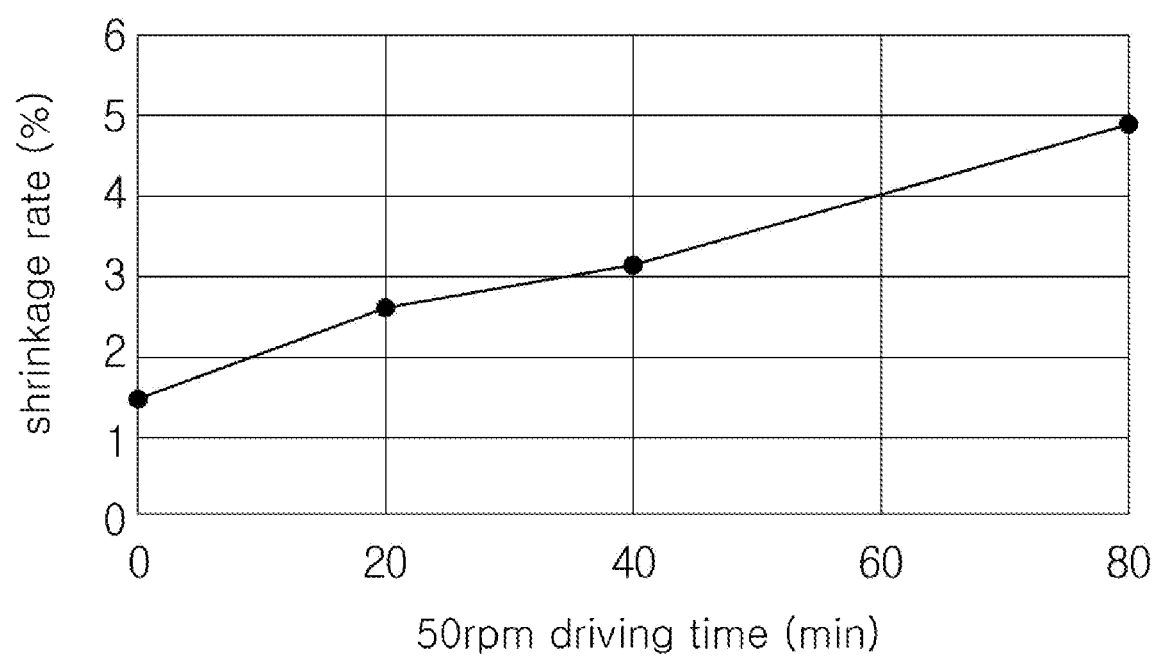
FIG. 17 is a graph showing a difference in shrinkage rate according to time when a control method of the exemplary laundry drying machine is applied.

FIG. 17 is a graph showing the difference in the shrinkage rate according to the time when the control method of the exemplary laundry drying machine is applied.

The graph shows the shrinkage of cotton clothes when the drum is rotated at 30 rpm or less (0 min) in the entire section (0 min), 30 rpm or less after 50 rpm in the initial 20 minutes, 30 rpm or less after 50 rpm in the initial 40 min, and 50 rpm in the entire section (80 min).

That is, as the time for which the fall motion occurs by rotating the drum at 50 rpm increases, the shrinkage rate also increases proportionally. As a result, if the drum 20 is driven at 30 rpm or less in all the agitating steps (S40), the shrinkage rate of the target object, which is conventionally about 4 to 5%, may be reduced to 1.5%.

Therefore, it is possible to reduce the shrinkage of the target object due to mechanical force by blocking the falling motion of the target object.

In some implementations, in the agitating step (S40), the control unit 100 can drive the circulation fan 33 to discharge the wet air present in the drum 20 to the outside. At the same time, the air outside the drum 20 may be introduced into the drum 20.

With this configuration, the water vapor of the target object can be induced to be evaporated by the air flow. In addition, the overheated anode electrode 41 and the matcher 42 can be cooled by this air flow.

In the agitating step (S40), the control unit 100 can stop the application of RF power for a preset agitating time tm and rotate only the drum 20. For example, the control unit 100 can stop applying the RF power for a time period of 3 seconds or more and 7 seconds or less and rotate only the drum 20, preferably stop the RF power application for a time period of 5 seconds and then rotate only the drum 20.

In some implementations, the drying step (S30) and the agitating step (S40) are repeated until a preset degree of drying is achieved (S50). In this case, the degree of drying may be determined based on whether or not the load of the target object has decreased to a preset level based on the load of the target object in the drying preparation step (S10), and the degree of drying may be determined through temperature change or humidity inside the drum. In addition, it is also possible to determine the degree of drying by calculating the time required for drying in consideration of the applied RF power and the heat capacity for each material of the target object. For example, the drying step (S30) and the agitating step (S40) may be repeatedly performed 36 times for 1 hour.

Figure 15:
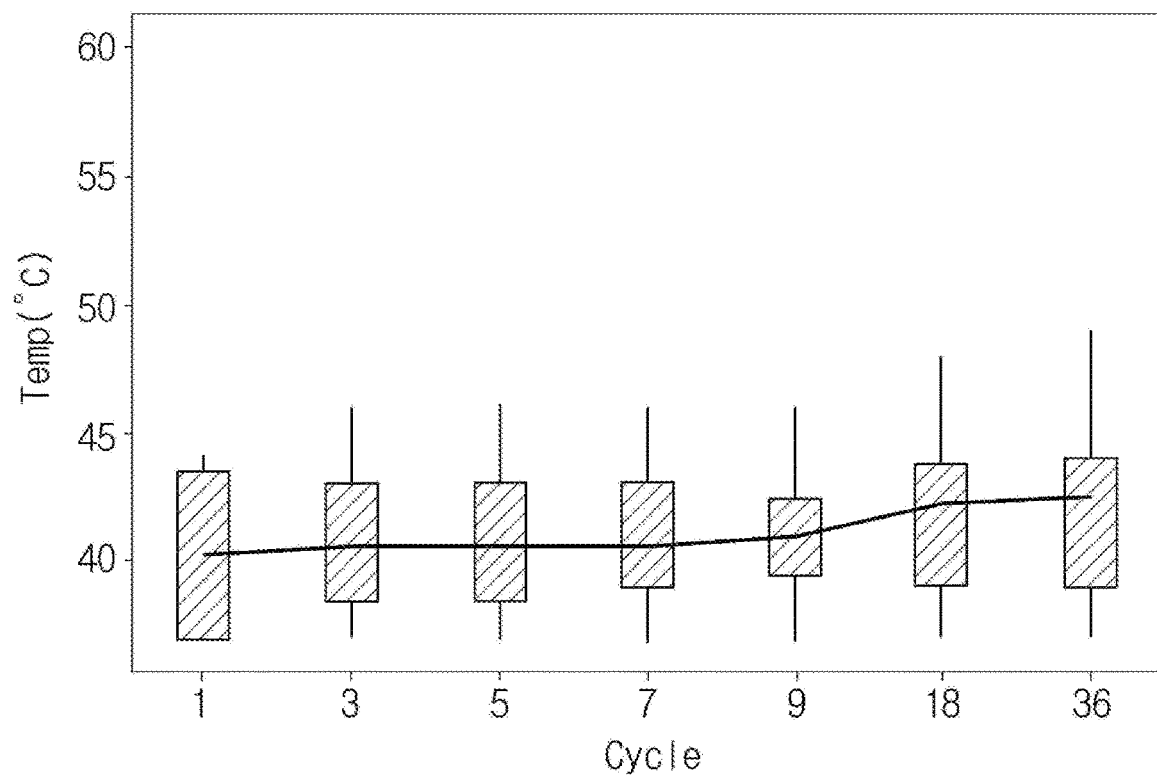
FIG. 15 is a graph showing a change in a temperature of a target object when a control method of the exemplary laundry drying machine is applied.

Considering the temperature change of the target object to which the control method of the exemplary laundry drying machine is applied with reference to FIG. 15, the temperature difference from the first cycle to the final 36th cycle is very small, and it can be seen that the temperature is maintained at 50 degrees or less.

Therefore, the control unit 100 has an effect of maintaining the internal temperature of the target object at 50 degrees or less to limit the occurrence of color transfer in the target object.

In some implementations, in the cooling step (S60), the control unit 100 cools the target object when the target object reaches a preset degree of drying. The cooling refers to a process of drying the target object by using the circulation fan 33 without operating the electric field generator 40. That is, when the target object reaches a preset degree of drying, the control unit 100 drives the circulation fan 33 for a predetermined time and rotates the drum 20. Accordingly, the target object accommodated in the drum 20 is rotated along the drum 20, and the target object is dried according to the air flow formed by the circulation fan 33.

After the cooling step (S60), the overall drying process of the exemplary laundry drying machine is ended.

What is claimed is:

1. A laundry drying machine comprising:
a cabinet;
a drum that is rotatably disposed in the cabinet and that is configured to accommodate a target object;
an electric field generator that is spaced apart from the drum and that is configured to, based on power being applied to the electric field generator, generate an electric field inside the drum; and
an exhaust duct configured to discharge air inside the drum,
wherein the electric field generator includes:
an anode electrode that is spaced apart from the drum, that is fixed to the cabinet, and that is configured to apply the electric field to the target object accommodated in the drum,
a power supply unit that is configured to supply the power to the anode electrode, and
a matcher that is provided in the cabinet and that is configured to match a source impedance of the power and an impedance of a load side, and
wherein the drum is configured to, based on a reflectivity of the electric field exceeding a predetermined ratio, reduce a rotation speed.

2. The laundry drying machine according to claim 1, wherein the electric field generator is configured to, based on the reflectivity of the electric field being less than or equal to the predetermined ratio, increase the power applied to the anode electrode.

3. The laundry drying machine according to claim 1, wherein the drum is configured to, based on the reflectivity of the electric field exceeding the predetermined ratio, reduce a rotation rate by 10%.

4. The laundry drying machine according to claim 2, wherein the electric field generator is configured to, based on the power being started to apply to the anode electrode, apply the power corresponding to a preset start power to the anode electrode, and
wherein the electric field generator is configured to, based on the reflectivity of the electric field being less than or equal to the predetermined ratio, apply the power corresponding to 20% of a preset drying power.

5. The laundry drying machine according to claim 4, wherein the electric field generator is configured to, based on (i) the power applied to the anode electrode corresponding to 20% of the preset drying power and (ii) the reflectivity of the electric field being less than or equal to the predetermined ratio, apply the power corresponding to 50% of the drying power to the anode electrode.

6. The laundry drying machine according to claim 4, wherein the electric field generator is configured to, based on (i) the power applied to the anode electrode corresponding to 50% of the drying power and (ii) the reflectivity of the electric field being less than or equal to the predetermined ratio, apply the power corresponding to 100% of the drying power to the anode electrode.

7. The laundry drying machine according to claim 2, wherein the drum is configured to, based on (i) a preset drying power being applied to the anode electrode and (ii) the reflectivity of the electric field reflected from the target object being less than or equal to the predetermined ratio, maintain the rotation speed.

8. The laundry drying machine according to claim 1, wherein the drum is configured to, based on the power being applied to the anode electrode, rotate.

9. The laundry drying machine according to claim 1, wherein the exhaust duct includes an air suction pipe, a fan housing, and an exhaust pipe.

10. The laundry drying machine according to claim 9, further comprising:
an air outlet that is in communication with the air suction pipe.

11. The laundry drying machine according to claim 10, wherein the air suction pipe has a flat shape.

12. A control method of a laundry drying machine that includes a drum configured to accommodate a target object and an anode electrode spaced apart from the drum and configured to generate an electric field in the drum, the control method comprising:
a drying step of applying power to the anode electrode and rotating the drum; and
an agitating step of cutting off the power applied to the anode electrode and rotating the drum,
wherein, in the drying step, the drum is configured to, based on a reflectivity of the electric field exceeding a predetermined ratio, reduce a rotation speed, and
wherein the power applied to the anode electrode is increased based on the reflectivity of the electric field being less than or equal to the predetermined ratio.

13. The control method according to claim 12, wherein the drying step includes:
a drying entry step of applying a preset start power to the anode electrode and rotating the drum at a preset start rotation speed, and
a rotation maintaining step of applying a preset drying power to the anode electrode and maintaining the rotation speed of the drum.

14. The control method according to claim 13, wherein, in the drying step, the drum is configured to, based on the reflectivity of the electric field exceeding the predetermined ratio after the drying entry step, reduce the rotation speed.

15. The control method according to claim 13, wherein the drying step further includes a first power increasing step of increasing the power applied to the anode electrode to 20% of the drying power based on the reflectivity of the electric field being less than or equal to the predetermined ratio after the drying entry step.

16. The control method according to claim 15, wherein, in the drying step, the drum is configured to, based on the reflectivity of the electric field exceeding the predetermined ratio after the first power increasing step, reduce the rotation speed.

17. The control method according to claim 15, wherein the drying step further includes a second power increasing step of increasing the power applied to the anode electrode to 50% of the drying power based on the reflectivity of the electric field being less than or equal to the predetermined ratio after the first power increasing step.

18. The control method according to claim 17, wherein, in the drying step, the drum is configured to, based on the reflectivity of the electric field exceeding the predetermined ratio after the second power increasing step, reduce the rotation speed.

19. The control method according to claim 17, wherein the drying step further includes a third power increasing step of increasing the power applied to the anode electrode to the drying power based on the reflectivity of the electric field being less than or equal to the predetermined ratio after the second power increasing step.

20. The control method according to claim 19, wherein, in the drying step, the drum is configured to, based on the reflectivity of the electric field exceeding the predetermined ratio after the third power increasing step, reduce the rotation speed.

* * * * *